(12) United States Patent
Willis

(10) Patent No.: US 7,346,668 B2
(45) Date of Patent: Mar. 18, 2008

(54) DYNAMIC PRESENTATION OF PERSONALIZED CONTENT

(75) Inventor: Brian Willis, Menlo Park, CA (US)

(73) Assignee: SAP Aktiengesellschaft, Walldorf (DE)

( * ) Notice: Subject to any disclaimer, the term of this patent is extended or adjusted under 35 U.S.C. 154(b) by 561 days.

(21) Appl. No.: 10/231,440

(22) Filed: Aug. 30, 2002

(65) Prior Publication Data

US 2003/0217121 A1    Nov. 20, 2003

Related U.S. Application Data

(60) Provisional application No. 60/380,863, filed on May 17, 2002, provisional application No. 60/380,834, filed on May 17, 2002, provisional application No. 60/380,864, filed on May 17, 2002.

(51) Int. Cl.
  *G06F 15/16* (2006.01)
(52) U.S. Cl. ............... 709/219; 707/3; 707/4; 707/5; 707/6; 707/9; 715/515; 715/526; 715/741; 715/742; 715/747
(58) Field of Classification Search ............... 715/515, 715/526, 741–742, 744–747
See application file for complete search history.

(56) References Cited

U.S. PATENT DOCUMENTS

| | | | |
|---|---|---|---|
| 5,442,740 A | 8/1995 | Parikh | |
| 5,848,424 A | 12/1998 | Scheinkman et al. | |
| 5,995,943 A | 11/1999 | Bull et al. | |
| 6,041,331 A | 3/2000 | Weiner et al. | |
| 6,049,821 A * | 4/2000 | Theriault et al. | ........... 709/203 |
| 6,058,277 A | 5/2000 | Streefkerk | |
| 6,064,980 A | 5/2000 | Jacobi et al. | |
| 6,076,166 A * | 6/2000 | Moshfeghi et al. | ............ 726/4 |

(Continued)

FOREIGN PATENT DOCUMENTS

EP    1 143 679 A2    10/2001

(Continued)

OTHER PUBLICATIONS

Bhatia, S. K., "Selection of Search Terms Based on User Profile," Proceedings of the 1992 ACM/SIGAPP Symposium on Applied Computing: Technological Challenges of the 1990's, Kansas City, MO 1992, pp. 224-233.

(Continued)

*Primary Examiner*—Bunjob Jaroenchonwanit
*Assistant Examiner*—Duyen Doan
(74) *Attorney, Agent, or Firm*—Fish & Richardson P.C.

(57) ABSTRACT

Methods and systems for dynamically presenting personalized content are disclosed. Articles may be collected, each article having content, attributes of the content, and content metadata characterizing individual elements of the content. The articles may be filtered, sorted and prioritized for each of a plurality of users, leaving an individualized subset of articles for a user. The subset may then be formatted for the user based on a capacity of a system of the user, the system capacity including rendering media available to the user system and/or an amount of presentation space available on the user system. In this way, a user may receive articles which are of the most interest to that user, in a format that is most convenient or preferable to the user.

30 Claims, 15 Drawing Sheets

U.S. PATENT DOCUMENTS

| | | | |
|---|---|---|---|
| 6,085,229 | A | 7/2000 | Newman et al. |
| 6,094,648 | A | 7/2000 | Aalbersberg |
| 6,154,764 | A | 11/2000 | Nitta et al. |
| 6,181,342 | B1 | 1/2001 | Niblack |
| 6,209,100 | B1 | 3/2001 | Robertson et al. |
| 6,236,395 | B1 | 5/2001 | Sezan et al. |
| 6,266,649 | B1 | 7/2001 | Linden et al. |
| 6,271,840 | B1 | 8/2001 | Finseth et al. |
| 6,300,947 | B1 | 10/2001 | Kanevsky |
| 6,317,722 | B1 | 11/2001 | Jacobi et al. |
| 6,327,628 | B1 | 12/2001 | Anuff et al. |
| 6,338,059 | B1 | 1/2002 | Fields et al. |
| 6,338,096 | B1 * | 1/2002 | Ukelson ................... 719/319 |
| 6,347,332 | B1 | 2/2002 | Malet et al. |
| 6,356,908 | B1 | 3/2002 | Brown |
| 6,356,922 | B1 | 3/2002 | Schilit et al. |
| 6,400,381 | B1 | 6/2002 | Barrett et al. |
| 6,421,706 | B1 | 7/2002 | McNeill et al. |
| 6,438,580 | B1 | 8/2002 | Mears et al. |
| 6,438,632 | B1 | 8/2002 | Kikugawa |
| 6,457,026 | B1 | 9/2002 | Graham et al. |
| 6,460,036 | B1 | 10/2002 | Herz |
| 6,470,338 | B1 | 10/2002 | Rizzo et al. |
| 6,480,885 | B1 | 11/2002 | Olivier |
| 6,549,935 | B1 | 4/2003 | Lapstun et al. |
| 6,553,412 | B1 | 4/2003 | Kloba et al. |
| 6,594,682 | B2 | 7/2003 | Peterson et al. |
| 6,646,549 | B2 | 11/2003 | Dawson |
| 6,697,824 | B1 | 2/2004 | Bowman-Amuah |
| 6,725,227 | B1 | 4/2004 | Li |
| 6,741,853 | B1 * | 5/2004 | Jiang et al. ................. 455/418 |
| 6,741,980 | B1 | 5/2004 | Langseth et al. |
| 6,904,463 | B1 * | 6/2005 | Fadel ........................ 709/236 |
| 6,918,090 | B2 * | 7/2005 | Hesmer et al. ............. 715/760 |
| 6,947,959 | B1 | 9/2005 | Gill |
| 6,959,319 | B1 * | 10/2005 | Huang et al. ............... 709/203 |
| 6,973,665 | B2 | 12/2005 | Dudkiewicz et al. |
| 6,978,316 | B2 * | 12/2005 | Ghaffar et al. .............. 709/246 |
| 6,990,633 | B1 | 1/2006 | Miyasaka et al. |
| 6,993,529 | B1 | 1/2006 | Basko et al. |
| 7,017,183 | B1 * | 3/2006 | Frey et al. ...................... 726/5 |
| 7,072,983 | B1 * | 7/2006 | Kanai et al. ................. 709/246 |
| 2001/0017707 | A1 | 8/2001 | Lee |
| 2002/0018078 | A1 | 2/2002 | Khan et al. |
| 2002/0029296 | A1 | 3/2002 | Anuff et al. |
| 2002/0049833 | A1 | 4/2002 | Kikinis |
| 2002/0053078 | A1 | 5/2002 | Holtz et al. |
| 2002/0059584 | A1 | 5/2002 | Ferman et al. |
| 2002/0112240 | A1 | 8/2002 | Bacso et al. |
| 2002/0122063 | A1 | 9/2002 | Weinberg et al. |
| 2002/0138844 | A1 | 9/2002 | Otenasek et al. |
| 2002/0143659 | A1 | 10/2002 | Keezer et al. |
| 2002/0174230 | A1 * | 11/2002 | Gudorf et al. .............. 709/227 |
| 2002/0174319 | A1 | 11/2002 | Rivers et al. |
| 2002/0178007 | A1 | 11/2002 | Slotznick et al. |
| 2002/0184319 | A1 | 12/2002 | Willner et al. |
| 2002/0194267 | A1 | 12/2002 | Flesner et al. |
| 2002/0198859 | A1 | 12/2002 | Singer et al. |
| 2002/0198973 | A1 | 12/2002 | Besaw |
| 2003/0018815 | A1 * | 1/2003 | Spicer et al. ................ 709/246 |
| 2003/0028896 | A1 | 2/2003 | Swart et al. |
| 2003/0033161 | A1 | 2/2003 | Walker et al. |
| 2003/0093790 | A1 | 5/2003 | Logan et al. |
| 2003/0101412 | A1 | 5/2003 | Eid |
| 2003/0126136 | A1 | 7/2003 | Omoigui |
| 2003/0217061 | A1 | 11/2003 | Agassi et al. |
| 2003/0229900 | A1 | 12/2003 | Reisman |
| 2004/0059705 | A1 | 3/2004 | Wittke et al. |
| 2004/0088355 | A1 | 5/2004 | Hagan et al. |
| 2004/0205473 | A1 | 10/2004 | Fisher et al. |
| 2004/0220926 | A1 * | 11/2004 | Lamkin et al. ................ 707/3 |
| 2004/0230572 | A1 | 11/2004 | Omoigui |
| 2005/0193335 | A1 | 9/2005 | Dorai et al. |
| 2005/0204276 | A1 * | 9/2005 | Hosea et al. .............. 715/501.1 |

FOREIGN PATENT DOCUMENTS

| | | |
|---|---|---|
| EP | 1 176 520 A2 | 1/2002 |
| EP | 1 367 513 A2 | 12/2003 |
| GB | 2 367 158 | 3/2002 |
| WO | WO 99/62011 | 12/1999 |
| WO | WO 00/65773 | 11/2000 |
| WO | WO 00/77689 | 12/2000 |
| WO | WO 01/06398 | 1/2001 |
| WO | WO 01/09737 A1 | 2/2001 |
| WO | WO 01/13287 A | 2/2001 |
| WO | WO 01/18688 A1 | 3/2001 |
| WO | WO 01/77903 A1 | 10/2001 |
| WO | WO 01/81829 A1 | 11/2001 |

OTHER PUBLICATIONS

Kamba, T. et al., "The Krakatoa Chronicle—An Interactive, Personalized, Newspaper on the Web," Proceedings of the International Conference on World Wide Web, Dec. 11, 1995, pp. 1-12.

Salembier, P. et al., "Description Schemes for Video Programs, Users and Devices," Signal Processing: Image Communication, Sep. 2000, vol. 16, pp. 211-234.

Seo, Y. W. et al., "Learning User's Preferences by Analyzing Web-Browsing Behaviors," Proceedings of the Fourth International Conference on Autonomous Agents, Barcelona, Spain, Jun. 3-7, 2000, pp. 381-387.

Sugiura, A. et al., "Internet Scrapbook: Automating Web Browsing Tasks by Demonstration," UIST '98, ACM Symposium on User Interface Software and Technology, San Francisco, CA, Nov. 1-4, 1998, pp. 9-18.

Boguraev, Branimir, et al., "Dynamic Presentation of Document Content for Rapid On-Line Skimming," AAAI Symposium on Intelligent Text Summarization, Mar. 23, 1998, XP002096508, 10 pgs.

Graham, Jamey, "The Reader's Helper: A Personalized Document Reading Environment," CHI '99 Conference Proceedings Human Factors in Computing Systems, Pittsburgh, PA, May 15, 1999, XP000894254, pp. 481-488.

Amazon.com, "Recommendations," http://www.amazon.com/exec/obidos/tg/browse/-/50856/ref=br_bx_c_2_1/002-7851280-4410446, (undated and Applicants believe it was publicly available prior to Aug. 30, 2002), printed from the Internet Feb. 27, 2004, , 2 pgs.

Amazon.com, "Why Was I Recommended This?" http://www.amazon.com/exec/obidos/tg/browse/-/764534/ref%3Dbr%5Fbx%5Fc%5F2%5F2/002-/002-7851280-4410446, (undated and Applicants believe it was publicly available prior to Aug. 30, 2002), printed from the Internet Feb. 27, 2004, 2 pgs.

Amazon.com, "Your Favorites," http://www.amazon.com/exec/obidos/tg/browse/-/560726/ref=br_bx_c_2_0/002-7851280-4410446, (undated and Applicants believe it was publicly available prior to Aug. 30, 2002), printed from the Internet Feb. 27, 2004, 2 pgs.

Netflix, "About Netflix," http://www.netflix.com/PressRoom?id=1005, (undated and Applicants believe it was publicly available prior to Aug. 30, 2002), printed from the Internet Jan. 5, 2004, 1 pg.

Netflix, "Fact Sheet," http://www.netflix.com/PressRoom?id=5206, (undated and Applicants believe it was publicly available prior to Aug. 30, 2002), printed from the Internet Jan. 5, 2004, 3 pgs.

SAP Aktiengesellschaft, "mySAP Technology: Portal Infrastructure: People-Centric Collaboration," undated materials, copyright 2001, 28 pgs.

"What is My Yahoo!?," http://wizards.yahoo.com/members/tools/publishing/wizards/server/bottom-right/1, (undated and Applicants believe it was publicly available prior to Aug. 30, 2002), printed from the Internet Feb. 27, 2004, 7 pgs.

Bulterman, D. C. A., et al., "GriNS: A Graphical Interface for Creating and Playing SMIL Documents," Computer Networks and ISDN Systems, North Holland Publishing, Amsterdam, NL, vol. 30, No. 1-7, pp. 519-529, XP004121396, no date.

Google News (BETA), "Top Stories," http://news.google.com, printed from the Internet Oct. 1, 2002, 5 pgs.

Google News (BETA), "A Novel Approach to News," http://news.google.com/help/about_news_search.html, printed from the Internet Oct. 1, 2002, 3 pgs.

IBM, "IBM Websphere Portal Server Product Architecture V2.1," Nov. 19, 2001, pp. 1-31, XP002268018.

Li, Chung-Sheng, et al., "Multimedia Content Description in the Infopyramid," Acoustics, Speech and Signal Processing, Proceedings of the 1998 IEEE International Conference, May 12, 1998, pp. 3789-3792, XP010279595.

* cited by examiner

```
<Article>
  <Time>2002 -04- 24 15:02</Time>
  <Importance>Normal</Importance>          705
  <Author>agent@food4all.com</Author>
  <Content Type=" text/narrative ">     710
  <Headline>
  Four of our top customers in the Eastern Region have pending complaints.   715
  </Headline>
                                                                              720
  <Details>
  Wacky Foods, with an annual sales volume of $10M have 8 pending complaints; My Muffin Ltd with $4M of
  annual sales have 1;  Breads R Us with $1M of annual sales have 3; and Have Your Cake, Inc with $850K
  of annual sales have 2.  The complaints KPI is at 88.7M
  </Details>
  </Content>

<Content Type=" text/html ">     725
  <Headline>
  Pending Support Complaints for Top Customers in Eastern Region    730
  </Headline>
  <Html>
```

| Top Customers of Eastern Region – Pending Support Complaints | | |
|---|---|---|
| Customer | Sales Vol | Complaints |
| Wacky Foods | $10M | 8 |
| My Muffins Ltd | $4M | 1 |
| Breads R Us | $1M | 3 |
| Have Your Cake Inc | $850K | 2 |
| Complaints KPI | | 88.7M |

735

```
  </Html>
  </Content>
  < DiscussionObjects >
  <Object Class="BizPartner" Key="Wacky Foods" />
  <Object Class="BizPartner" Key="My Muffins Ltd" />
  <Object Class="BizPartner" Key="Breads R Us" />        740
  <Object Class="BizPartner" Key="Have Your Cake Inc"/>
  <Object Class="Region" Key="Eastern" />
  <Object Class="SecurityRealm" Key="Sales Numbers" />
  </DiscussionObjects>
  </Article>
```

The Company Times

Four of our top customers in the Eastern Region have pending complaints

Wacky Foods, with an annual sales volume of $10M have 8 pending complaints; My Muffin Ltd with $4M of annual sales have 1; Breads R Us with $1M of annual sales have 3; and Have Your Cake Inc with $850K of annual sales have 2. The complaints KPI is at 88.7M.

| Top Customers of Eastern Region – Pending Complaints | | |
|---|---|---|
| Customer | Sales Vol | Complaints |
| | $10M | 8 |
| | $4M | 1 |
| | $1M | 3 |
| | $850K | 2 |
| Complaints KPI | | 88.7M |

☺ Today's marketing strategy meeting postponed

Joan Simmons rescheduled the meeting to Wed, 4/23 at 9:15 in the Paris room. Your calendar has been updated.

Tell me...|   Copyright © The Company, April 21, 2002

---

☺ Market Report
Dow 10,543.17 −54.12
Nasdaq 1719.67 +8.01
S&P 1201.31 −4.23

☺ Business Partner News
Nestla reports quarterly earnings down 5%
Krafti Cheese CEO resigns
JJ Juice beats expectations, JJJ up 15%

☺ Competition News
Burger Queen names James Joaquin as CIO
Chico Catering and Krafti Cheese announce strategic partnership

---

☺ Headline News
Israel pulls out of the West Bank
Venezuela coup thwarted
Teacher of the year honored by George Bush ☺ Weather
San Jose, CA
Low Hi
Mon 45 65

☺ Other News
6 documents are awaiting your approval
Phil Collins to perform in Shark Tank
1 important email

FIG. 8

☺ Four of our top customers in the Eastern Region have pending complaints [301]

Wacky Foods, with an annual sales volume of $10M have 8 pending complaints; My Muffin Ltd with $4M of annual sales have 1; Breads R Us with $1M of annual sales have 3; and Have Your Cake Inc with $850K of annual sales have 2. The complaints KPI is at 88.7M.

| Top Customers of Eastern Region – Pending Complaints | | |
|---|---|---|
| Customer | Sales Vol | Complaints |
| Wacky Foods | $10M | 8 |
| My Muffins Ltd | $4M | 1 |
| Breads R Us | $1M | 3 |
| Have Your Cake Inc | $850K | 2 |
| Complaints KPI | | 88.7M |

FIG. 11

```
<Article>
    <Time>2002 -04- 24 15:02</Time>                1405                                1400
        <Importance>Normal</Importance>
        <Author>agent@food4all.com</Author>
        <Content Type=" text/narrative ">     1410
    <Headline>
        Four of our top customers in the Eastern Region have pending complaints.  1415
    </Headline>                                                                              1420
<Details>
    Wacky Foods, with an annual sales volume of $10M have 8 pending complaints;My Muffin Ltd with $4M of
    annual sales have 1;Breads R Us with $1M of annual sales have 3  ; and Have Your Cake, Inc with
    of annual sales have 2. The complaints KPI is at 88.7M                        $850K
</Details>
</Content>
    <Content Type=" text/html ">  1425
<Headline>
    Pending Support Complaints for Top Customers in Eastern Region  1430
</Headline>
<Html>
```

| Top Customers of Eastern Region – Pending Support Complaints | | |
|---|---|---|
| Customer | Sales Vol | Complaints |
| Wacky Foods | $10M | 8 |
| My Muffins Ltd | $4M | 1 |
| Breads R Us | $1M | 3 |
| Have Your Cake Inc | $850K | 2 |
| Complaints KPI | | 88.7M |

1435

```
</Html>
</Content>
    <Content Type=" image/gif ">   1440
<Headline>
    Pending Support Complaints for Top Customers in Eastern Region  1445
</Headline>
<Image>
```

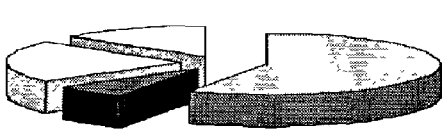

1450

```
</Image>
</Content>
    <Content Type=" music/midi ">  1455
<Midi>
```

1460

```
</Midi>
</Content>
</Article>
```

FIG. 14

DYNAMIC PRESENTATION OF PERSONALIZED CONTENT

CROSS-REFERENCE TO RELATED APPLICATIONS

This application claims priority from U.S. Provisional Application No. 60/380,863, titled "Enhancing Information Portals with Supplemental Contextual Content," filed May 17, 2002, and from U.S. Provisional Application No. 60/380,834, titled "Personalizing Portal Content Dynamically," filed May 17, 2002, and from U.S. Provisional Application No. 60/380,864, titled "Rich Media Information Portals," filed May 17, 2002, which are hereby incorporated by reference in their entirety for all purposes.

TECHNICAL FIELD

Certain disclosed implementations relate generally to information displays, and more particularly to dynamic, customized displays.

BACKGROUND

Technologies exist which allow users to designate categories of information in which desired content may be presented. For example, web sites may allow users to select categories from a variety of different sources and content providers. Such sites are generally known as "portals," and provide a central gateway through which users can be presented with options and links to various information sources. In this way, users can check, for example, their stocks, mail, local weather, sports scores, and movie listings.

Other techniques exist that attempt to provide users with content that will be of particular interest to each user. For example, web sites may track items such as books and Digital Video Disks ("DVDs") based on attributes of such items, such as title, author, performer, and genre. By tracking previously-purchased books and DVDs, registered users may be presented with a web page offering items with similar attributes.

Finally, video recording systems may allow users to voice opinions about specific shows. Coupled with a programming guide, these video recording systems can later record concurrent episodes of the show or shows starring the same actor or shows of similar interest. Other techniques may exist for providing users with content having some degree of personalization for each user.

In another example, portals are capable of providing categorized content in disparate pieces (sometimes referred to as "iViews"), where each iView and its associated content can be aggregated into a single delivery package (for example, a web page). Users may select a category of content to be included within each iView, and may generally choose which iView(s) to see and exercise some control over how it is positioned inside the aggregated result.

In practical implementations of portals utilizing iViews, however, most users set up their portal once, if at all, and will thereafter simply keep these initial preferences. As a result, such users may miss out on viewing new content and categories of content that may be more interesting than the iViews originally selected. Similarly, content which is most interesting to the user at a particular time will not be properly emphasized within the aggregated result, such that the user does not give it the attention it is due.

Even if users update their iView configuration very frequently, each configuration is still static. That is, the set of iViews shown, and the order in which they are shown, is constant. Moreover, although the content of each iView may change over time (e.g. actual news headlines), its overall subject is static (for example, company news).

Finally, conventional portals often concentrate on the computer screen as the main output device thru which the user will receive the delivered content. The scope may be further limited if the portal is rendered in Hypertext Mark-up Language ("HTML") and runs in a web browser. Even when mobile devices like personal digital assistants ("PDAs") and smart cellular phones are used to access conventional portals, the portals are often still rendered in a type of browser.

Such a browser-limited approach may have emerged from an impression that browsers are ubiquitous on many client machines and that portals leave no-footprint on those clients by rendering to them. However, by heading in that direction the portal vendors have limited the capabilities of the portal and the distribution of the content. Moreover, to the extent that delivered content is typically text or image-based in a browser, users may have come to expect only those formats.

The browser-centric approach is usually used for the average business user who comes in to the office in the morning, and logs-in to his computer. However, there are many scenarios that prohibit access to computers. For example, many blue-collar employees do not have computers at their place of work. Also, many people are simply not computer savvy, and/or find computers intimidating. Even the savvy computer user has situations where using a laptop is difficult or impossible (the drive to the office, for example).

SUMMARY

In contrast with the above, one implementation of a content presentation system described below enables dynamic selection of the shown set of iViews, based on an individual relevance of each iView to the user at any given time. That is, this implementation allows the user to personalize content based not only on its expected result (that is, the type of iView), but also on its actual result (that is, actual content of the iView).

In another implementation, a system incrementally learns the user's preferences regarding previously-shown items and categories, and uses that information to decide what content should be shown to the user in the future. Time may also be of significance, for example, by playing a part in deciding a level of relevance for each iView with respect to a specific user.

In another implementation, a system combines the concepts of the portal and personalized content with other delivery channels, such as, for example, telephone, radio, and television. The synergy opens up many new opportunities, such as "Enterprise TV," wherein a television is placed in a lobby of a company, the company cafeteria, or other high-traffic areas, or "Enterprise radio," wherein news (particularly company news) is broadcast to all employees over the airwaves. Yet another example is voice mail, wherein messages are left on the employee's voice mail. In this last example, participants of a meeting can easily be notified when a meeting is postponed.

In one general aspect, delivering personalized content may include accessing a plurality of media assets, each media asset including content, attributes of the content, and content metadata characterizing individual elements of information within the content. A subset of the plurality of media assets may be associated with a user, based on the attributes and content metadata, and on preference metadata associated with the user as it relates to the content metadata. A portion of the subset may be aggregated into personalized content and delivered to the user.

A capacity of a user system to present the personalized content may be determined, and may include determining a type of media available on the user system for presenting the media assets, or determining an amount of space available on the user system for presenting the media assets.

Preference metadata may include a formatting preference of the user, and the personalized content may be based on the formatting preference.

In accessing the plurality of media assets may include, information within the content may be analyzed, the content metadata may be created, and the content metadata may be associated with the content within the media asset.

In associating the subset of the plurality of media assets with the user, the plurality of media assets may be filtered based on the preference metadata, so that the subset is a filtered subset, and the filtered subset may be prioritized, based on the content metadata and the preference metadata, to thereby assign a priority level to each media asset within the filtered subset. The preference metadata may includes geographic information related to a position of the user.

In aggregating the portion of the subset, the portion may be assembled from the filtered subset according to the priority level assigned to each media asset within the filtered subset and based on an amount of space available to the user for receiving the personalized content. Also, media assets having a high priority level may be assigned to relatively more prominent positions within a type of presentation canvas associated with the user. Also, only a fraction of a chosen media asset may be included in the personalized content, and a link to a remainder of the chosen media asset may be included in the personalized content, the link providing the user with an ability to access the media asset in its entirety. Such a media asset may have a relatively low priority level among the portion of the subset of media assets.

In aggregating the portion of the subset, the portion may be assembled from the subset according to a priority level assigned to each media asset within the subset, and based on an amount of space available to the user for receiving the personalized content, the content metadata, and the preference metadata.

In delivering the personalized content to the user, a request for the personalized content may be received from the user, and the personalized content may be delivered to the user in response to the request. The request may include information relating to a capability of a system of the user to present the personalized content.

Feedback may be received from the user with respect to the personalized content, and the personalized content may be updated based on the feedback. Feedback received from the user may include incorporating the feedback as a modification of the preference metadata associated with the user.

The preference metadata may include at least one of an importance level assigned by the user, a security level of the user with respect to one or more of the media assets or content metadata, and a preference of the user for a content presentation type.

The personalized content may be rendered as one of a web page, a video segment, an audio segment, and a text segment. The personalized content may be delivered electronically.

Accessing a plurality of media assets, associating a subset of the plurality of media assets with a user, aggregating at least a portion of the subset, and delivering the personalized content to the user may be performed electronically.

Accessing a plurality of media assets, associating a subset of the plurality of media assets with a user, aggregating at least a portion of the subset, and delivering the personalized content to the user may be performed for a plurality of users, each user being associated with separate preference metadata.

The personalized content may be delivered via a private network, or via a public network.

In another general aspect, personalized delivery of articles may be accomplished by a system including an article reader operable to access information for inclusion in a pool of articles, each article in the pool of articles including attributes of the article, content, and content metadata characterizing individual elements of information within the content. The system may also include a sorting engine operable to input the pool of articles and individually organize the articles according to the content metadata and preference metadata associated with a user, to thereby output sorted articles, as well as a pagination engine operable to determine a format for rendering the sorted articles consistently with the content metadata and the preference metadata. The system may also include a delivery subsystem operable to deliver the sorted articles for rendering in accordance with the format.

The pagination engine may determine the format based on characteristics of a user system of the user, including an amount of space available to the user system for presenting the sorted articles. The article reader may inserts the content, attributes and the content metadata of each article into an Extensible Markup Language ("XML") message for each article, and the content of an article may be included multiple times as multiple content types within the article.

The system may also include a metadata enhancer operable to analyze information within content of an article and generate content metadata for the article.

The system may also include a content-based router operable to filter articles from the pool of articles based on the preference metadata, and to thereby create a filtered pool of articles. The content-based router may further operable to filter articles from the pool of articles based on an access control list.

The preference metadata may include geographic information related to a position of the user. The sorting engine is may be further operable to individually assign a priority level to each article within the filtered pool of articles. The pagination engine may be further operable to determine a presentation of an article based on the priority level associated with the article.

An article within the pool of articles may have a predetermined lifetime, after the expiration of which the article may be removed from the pool of articles.

The sorting engine may be further operable to receive updates to the preference metadata from the user and re-sort the pool of articles accordingly.

In another general aspect, an apparatus may include a storage medium having instructions stored thereon. The instructions may include a first code segment for accessing a plurality of media assets, each media asset including content, attributes of the content, and content discussion objects characterizing individual elements of the content, a second code segment for prioritizing the plurality of media assets individually, based on the content discussion objects and on preference discussion objects associated with a recipient as the preference discussion objects relate to the content discussion objects, to thereby obtain prioritized media assets, a third code segment for aggregating a subset of the prioritized media assets, based on a capacity of a recipient system to present the prioritized media assets as a formatted subset on the recipient system, and a fourth code segment for delivering the formatted subset to the recipient as personalized content.

The capacity of the recipient system may include an amount of space available on the recipient system for presenting the formatted subset, and may include a capability of the recipient system to present a media asset in a given rendering medium.

The first code segment may include a fifth code segment for generating additional content discussion objects, and the additional content discussion objects may be generated for a media asset in accordance with an object model and the content of the media asset.

The second code segment may include a fifth code segment for filtering the media assets based on the preference discussion objects.

The instructions may further include a fifth code segment for identifying a content discussion object appearing within the personalized content, a sixth code segment for receiving preference information from the user regarding the content discussion object, and a seventh code segment for updating the preference discussion objects based on the received preference information.

The instructions may further include a fifth code segment for providing an article approval system within the personalized content and with respect to a designated article within the personalized content, a sixth code segment for receiving preference information from the recipient regarding the designated article via the article approval system, and a seventh code segment for updating the preference discussion objects based on the received preference information.

In another general aspect, delivering personalized content to a user may include accessing a plurality of articles, each article having associated therewith a plurality of discussion objects. The subset of the plurality of articles may be associated with a user, based on preference discussion objects received from the user. The subset may be ranked based on the discussion objects and the preference discussion objects, and the request may be received from the user for delivery of personalized content, where the request may include capacity information describing a capacity of a user system of the user to present the personalized content. A portion of the ranked subset may be formatted in accordance with the capacity information to obtain the personalized content, and the personalized content may be delivered to the user in response to the request.

Formatting the portion of the ranked subset may include formatting the web page based on a result of said ranking of the subset. Formatting the portion of the ranked subset may be based on a result of ranking the subset.

In another general aspect, personalized content may be rendered by means for accumulating a pool of articles, each article including content and content metadata, means for determining user-preferred articles from among the pool of articles, and means for delivering the user-preferred articles. The personalized content may further be rendered using means for arranging the user-preferred articles so that more highly-preferred articles are more prominently displayed than less preferred articles.

The details of one or more implementations are set forth in the accompanying drawings and the description below. Other features will be apparent from the description, the drawings, and the claims.

DESCRIPTION OF DRAWINGS

FIG. 7 is an example of an article.

FIG. 8 is an example of a hypertext markup language ("HTML") result page.

FIG. 11 is an example of a floating toolbar designed to allow users to input preference information.

FIG. 14 is an example of an article used in one implementation of the system of FIG. 13.

DETAILED DESCRIPTION

Figure 1:
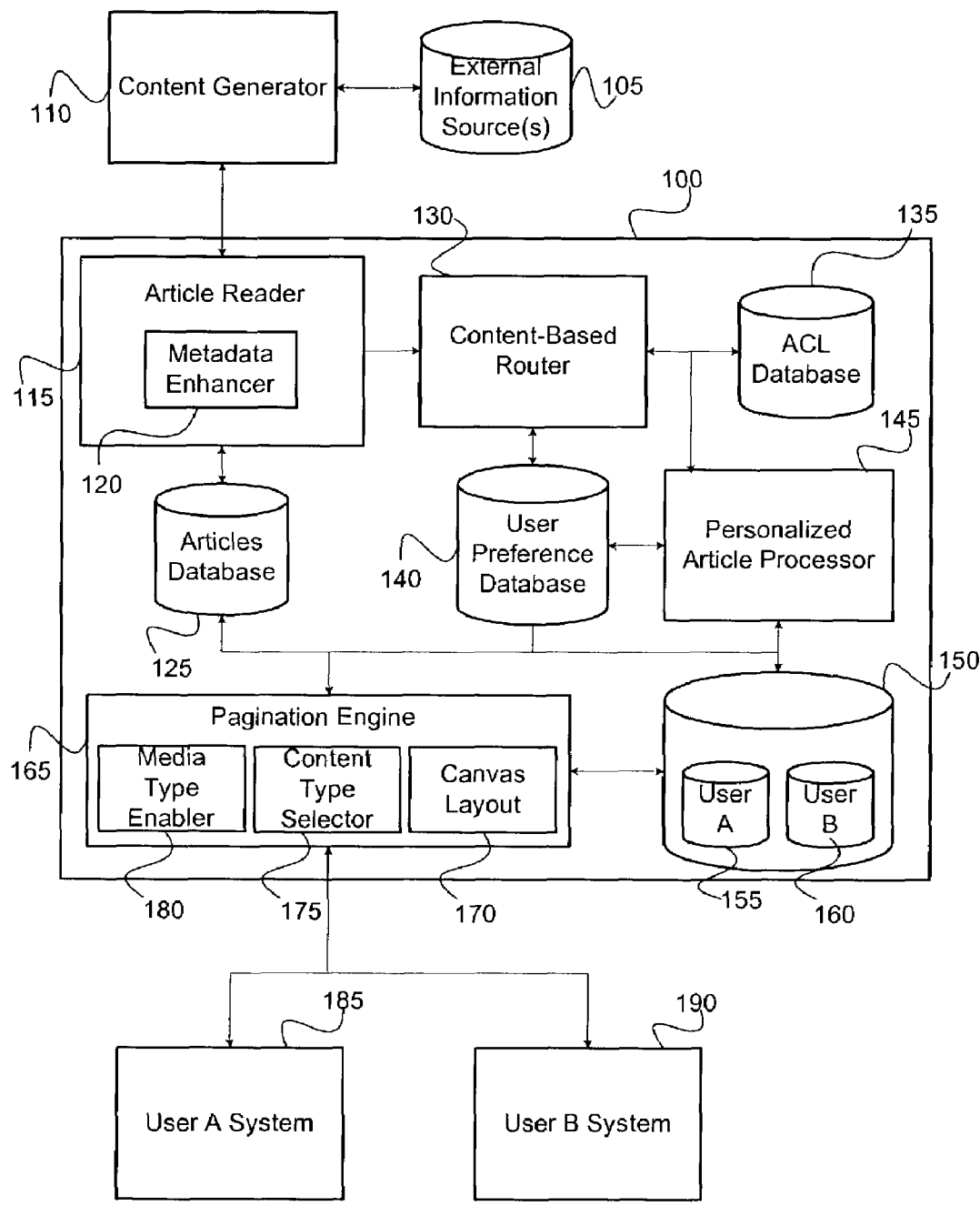
FIG. 1 is an architectural block diagram of one implementation of a content presentation system.

FIG. 1 is an example of a content presentation system including a system 100. In FIG. 1, external information from an external information source 105 is received by a content generator 110, which generates a corresponding article. Many types of external information sources 105 may be used, as will be discussed in more detail with respect to FIG. 2. Also, content generator 110 may utilize various techniques for gathering and publishing the information as discrete articles. For example, content generator 110 may utilize software agents to gather appropriate information (agents are generally defined as automatons running on a scheduled basis and querying a data source for information and either producing or not producing content based in part on the result of that query). Moreover, in other implementations, content generator 110 may be included within system 100.

The use of the term "article" in this context, as is discussed in more detail below, generally refers to a discrete collection of information that may include content and information about the content. Information about the content may include high-level attributes of the article, such as its author or general subject heading (for example, sports or weather). The information about the article may also include portions of the actual content itself used to articulate content metadata, perhaps in the form of "discussion objects."

In general, discussion objects are considered to be conceptual or tangible objects that are mentioned (discussed) as part of an article. Similarly, "discussion classes" are the types, or categories, of discussion objects. For example, an article about a discussion class of "computer manufacturers" may mention discussion objects "International Business Machines" ("IBM") many times, while only mentioning "Dell" infrequently. By determining at least some information directly from such specific discussion objects within the content of the article, this implementation is capable of accurately sorting articles against a user's interests.

Articles may be, for example, text, video, audio, HTML, or another available rendering medium, or a combination of two or more of these media. Articles may contain the same piece of content in multiple forms, and may permit generation of one type of content from another, as discussed below. Therefore, articles may also be referred to as "media assets," or other similar terminology describing such information to be passed on to a user. Content of an article may be a publicly-available web page (or portion thereof), an internal electronic mail, an individual's personal contact information, weather information, or a set of stock quotes. Content may also be obtained from specific applications, such as a profit and loss report of a company, an online analytical processing ("OLAP") report, a "print-out" of a sales order, or many other examples of discrete pieces of content to be made available to the user(s).

In FIG. 1, then, an article reader 115 accesses articles from content generator 110. Some articles may already include attribute and content metadata information. If a particular article has no associated metadata, a metadata enhancer 120 may be used to examine the content of the article and generate metadata accordingly. Even if some information, such as attribute information, is included with an article, metadata enhancer 120 may be used to further enhance the article.

In one implementation, system 100 may be provided to an enterprise as a resource for its employees and/or customers. The enterprise may have its own object model (that is, definition of permissible discussion objects) describing how the content metadata should be generated, characterized, and interpreted. These object models may differ from one enterprise to the next; for example, IBM might be a "customer" to one enterprise and a "supplier" to another. Individual enterprise object models can therefore be implemented instead of, or in conjunction with, a standardized, centralized object model.

In particular, articles generated within an enterprise may require very little metadata enhancement, whereas articles obtained from publicly-available web pages may require a substantial amount of metadata enhancement.

Accessed articles are stored in a database 125, and information referencing the articles is passed on to a content-based router 130. Although entire articles could be passed through the system 100, other techniques may be used. For example, only links to corresponding articles need be circulated through system 100, with the articles themselves remaining stored in database 125. As another example, such links may be circulated with the associated attribute and/or content metadata, but without the content itself; in this way, the article may processed (as discussed below), without actually having to circulate the article in its entirety.

Content-based router 130 examines each article with respect to its content and associated attributes and content metadata, for example, discussion objects, and compares this information to information stored for individual users. For example, an Access Control List ("ACL") database 135 contains a security clearance for each user with respect to various subjects, so that a user who is not cleared to receive certain information within an article will not receive that article. A user preference database 140 contains information about each user, for example, the extent to which a user likes or dislikes a particular subject, or the type of device(s) the user may be receiving the articles on.

Any type of router capable of routing articles based on content as described herein may be built and/or utilized to implement system 100. One type of router that is capable of performing the functionality of content-based router 130 is known as Elvin and is produced by the Distributed Systems Technology Centre (DSTC). Other types of content-based services include Gryphon, produced by International Business Machines (IBM), and Keryx, a Java-notification service by Hewlett Packard.

User preferences for populating user preference database 140 can be obtained by a number of techniques. For example, the preferences could be gained by asking users to fill out a preference form before gaining access to system 100. As another example, the preferences can be modified over time by obtaining feedback from the users, examples of which are discussed in more detail below.

By accessing databases 135 and 140, content-based router 130 is able to filter articles which are restricted or are of no interest with respect to a particular user. The action of content-based router 130 thus eases the burden on a personalized article processor ("PAP") 145, which has the job of individually prioritizing the remaining articles, based on a comparison of contents of the user preference database 140 to the content and to the content metadata/attributes of each article. Accordingly, individually-sorted articles may be stored in a sorted articles database 150, where articles for a User A and a User B are stored with their corresponding priority information for each user in database portions 155 and 160, respectively.

A pagination engine 165 thus gains access to a set of articles associated with, and prioritized with respect to, individual users. Pagination engine 165 will typically have access to characteristics of the client system being used by each user. This information may be stored in user preference database 140, or (as explained in more detail below) it may be determined from the user request at the time of the request.

In either case, pagination engine 165 determines a layout of the canvas being used by each user, using a canvas layout subsystem 170. In this context, the term "canvas" includes any rendering media in which articles may be presented. Canvas examples include web pages (on desktop computers, laptops, Personal Digital Assistants ("PDAs"), web-enabled cell phones, etc.), audio (for example, cell phone or radio), video (for example, television or Motion Picture Expert Group ("MPEG") player), or another type of device capable of receiving content within an article and presenting it to the user.

Since, as a practical matter, a canvas will typically have capacity limitations, one of the services of the canvas layout subsystem 170 within pagination engine 165 is to determine how much "space" is available to the user for displaying articles. For example, a web browser on a PDA will be able to display a smaller number of articles than a browser on a desktop computer. As another example, a user who receives audio articles via cell phone or radio may only have twenty minutes during a car ride during which to listen to articles. In short, canvas layout subsystem 170 determines any user-specific capacity constraints when deciding which articles to provide to a given user.

A content-type selector 175 determines which rendering media are available to the user for the selected canvas, and which articles are consistent, or can be made to be consistent, with that media. For example, content-type selector 175 may determine that a canvas has video and HTML capabilities, but not audio.

Finally within pagination engine 165, a media-type enabler 180 is available to enable a rendering media that would not ordinarily be available to the user (based on the content type(s) of the articles), when feasible and desired. One example of this feature is the capability of reading aloud to the user an email that is included as an article. Another example is the generation of an animation of a newscaster, complete with moving lips, to read aloud a print story to the user. These and other examples are discussed in more detail below.

During a final portion of the pagination process, pagination engine 165 aggregates the selected articles, in their selected formats, and delivers a personalized "page" of information to each user, so that each user receives articles for rendering that are of the most interest to him or her at a given point in time (or that the system determines the user should/must see, even if the user has expressed non-interest in such an article, such as a direction from the user's boss, or an article about a "hot" topic of the day). User systems 185 and 190 thus receive information suitable for rendering a page of information consistently with their respective system capabilities and requirements.

System 100 may also receive feedback from the users to be recorded in user preference database 140, so that the pages increasingly become better-personalized to each user as time goes by. The use of user preference feedback, as well as various formats in which pages may be rendered, are discussed below.

System 100 may be implemented in an enterprise environment, as discussed above, for the convenience of employees and/or customers of the enterprise. Implementations may be utilized via various other private networks, such as a university or other school network. On the other hand, implementations may be provided to members of the public at large, via the Internet.

Figure 2:
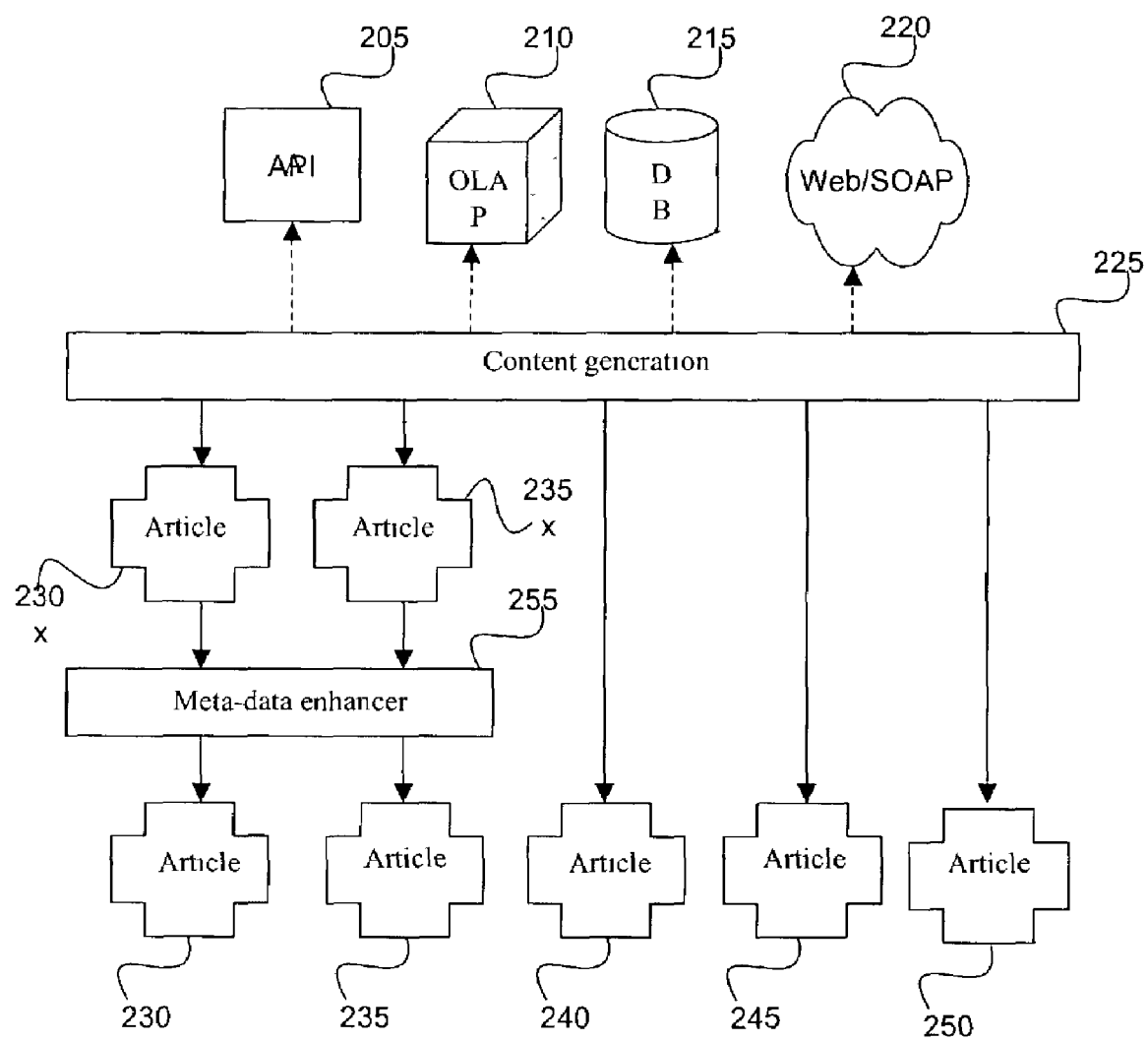
FIG. 2 is an example of a first portion of a process flow used by the system of FIG. 1.
Figure 3:
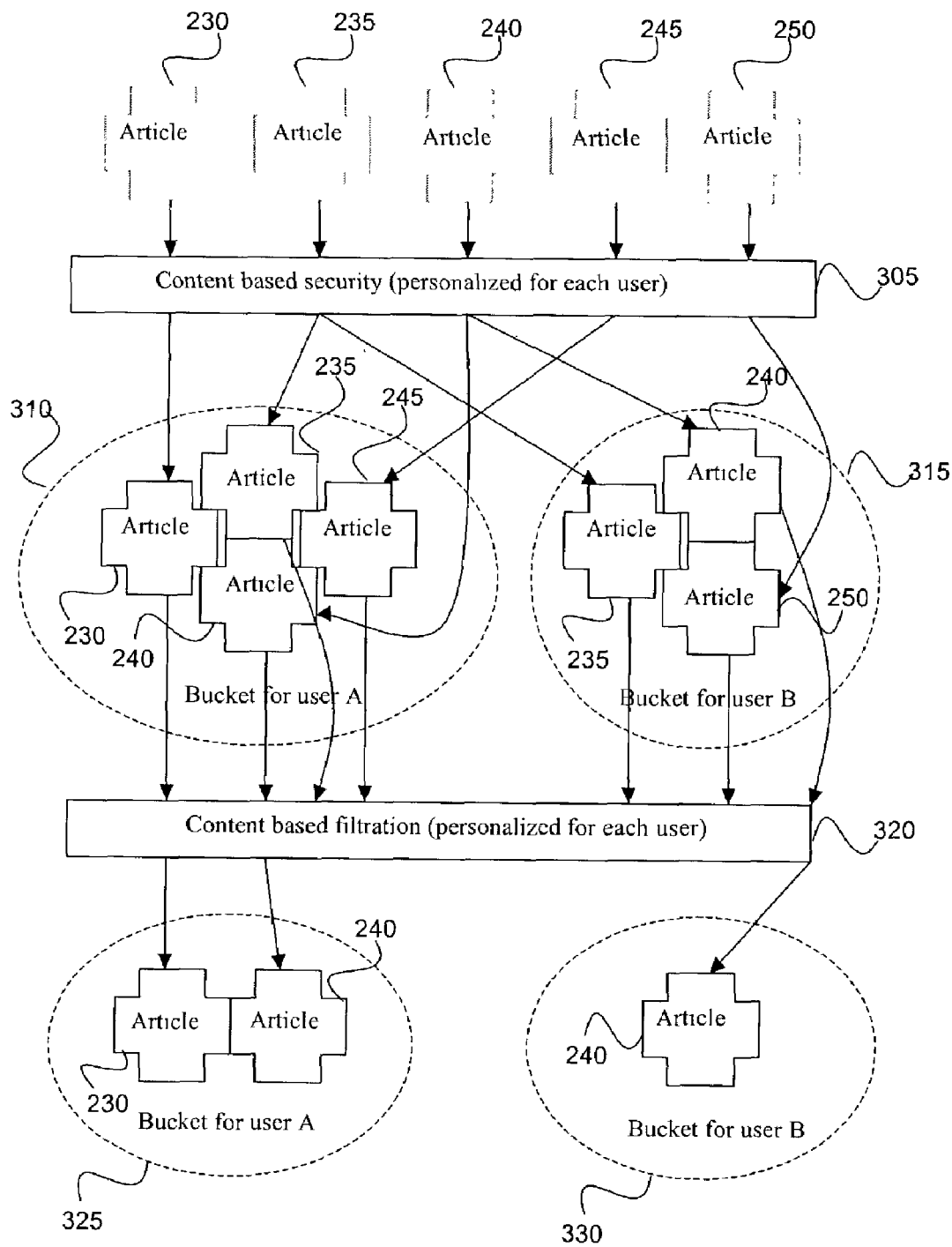
FIG. 3 is an example of a second portion of a process flow used by the system of FIG. 1.
Figure 4:
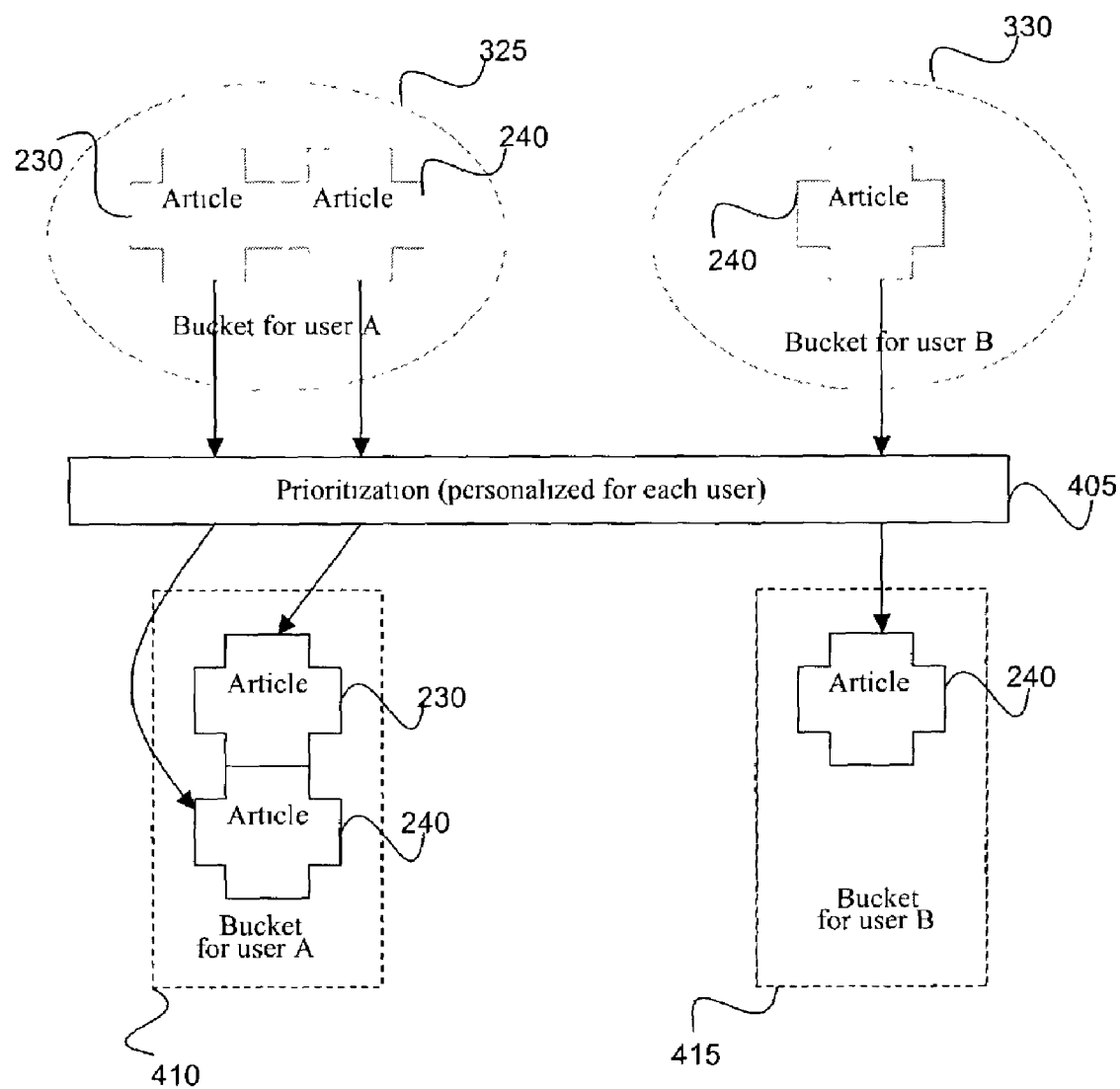
FIG. 4 is an example of a third portion of a process flow used by the system of FIG. 1.

FIGS. 2-4 demonstrate a process flow that might be used by the system of FIG. 1. FIG. 2 demonstrates a technique for gathering a pool of articles to be later filtered, sorted, and rendered to a user. In FIG. 2, sources of information for articles might include an application's application program interface ("API") 205, an on-line analytical processing ("OLAP") server 210, a database 215, and the world-wide web 220 (perhaps queried through the hypertext transfer protocol ("HTTP"), simple object access protocol ("SOAP") or other common protocols of the Internet).

Content generation occurs in a process 225, during which articles are generated. Some articles, such as articles 230x and 235x, might be generated without attribute information or content metadata. In this case, meta-data enhancer 255 may be used to examine such articles and generate content metadata to thereby produce articles 230 and 235. Other articles, such as articles 240, 245, and 250, may already be generated with attribute data (describing general features of the articles such as author and date of publication) and content metadata (characterizing actual content of the articles). It should be noted that, in FIGS. 2-4, articles including content metadata are illustrated with a dotted background, whereas articles having no content metadata (such as articles 230x and 235x) are shown with a plain background.

It should be understood that various techniques may be used for gathering article content. For example, software agents may operate in an agent execution environment which may serve as a host for the runtime execution of agents and administer execution of the agents (for example, scheduling of the agents). The agents may be used to query various databases, such as those shown in FIG. 2. On the other hand, the content could also be generated within system 100, as referred to above with respect to FIG. 1, or could be obtained by a variety of other means.

Examples of content that might be obtained according to FIG. 2 include a querying of the OLAP database 210 for a list of the top twenty customers in a particular region of an enterprise implementing system 100. For each one of these customers, an agent may access the API 205 of a customer relationship management ("CRM") application, and then report the list of top customers that have pending complaints with customer service. This list may be used as an article, as discussed below.

Another example of content for articles might be current levels of the financial markets, gleaned from the web 220. Many other types of content, whether internal to an enterprise or simply drawn from the public domain, may form the basis for an article.

In FIG. 2 and continuing into FIG. 3, articles 230, 235, 240, 245, and 250 thus represent a pool of articles, from which a subset for each user will be drawn. Once a pool of articles is established at a given point in time, a content-based security analysis 305 may be performed, the analysis being personalized for each user. Analysis 305 may be performed within content-based router 130 by accessing ACL database 135, both of FIG. 1. In this way, articles which a particular user does not have security rights to access will be removed prior to actual content-based sorting, in order to make the sorting process more efficient.

After security analysis 305 is complete, a "bucket" 310 of articles exists for a user A, and a separate bucket 315 of articles exists for user B. At this point, content-based filtration analysis 320 occurs, wherein the content-based router 130 interacts with user-preference database 140 in FIG. 1 to determine which of the articles in buckets 310 and 315 match the interests of users A and B, respectively. This process results in refined buckets 325 and 330, as shown in FIG. 3 and continuing into FIG. 4.

FIG. 4 demonstrates a prioritization process 405 that occurs within PAP 145, using data from within user preference database 140 in FIG. 1. As a result of process 405, articles within buckets 325 and 330 are prioritized and stored in final buckets 410 and 415, in accordance with the preferences of users A and B, respectively. Although FIG. 4 shows only a few articles in buckets 410 and 415 for the sake of clarity, the number of articles that can be assigned to a given user as a result of the operations of FIGS. 1-4 can be significantly higher and is limited only by system performance considerations.

Figure 5:
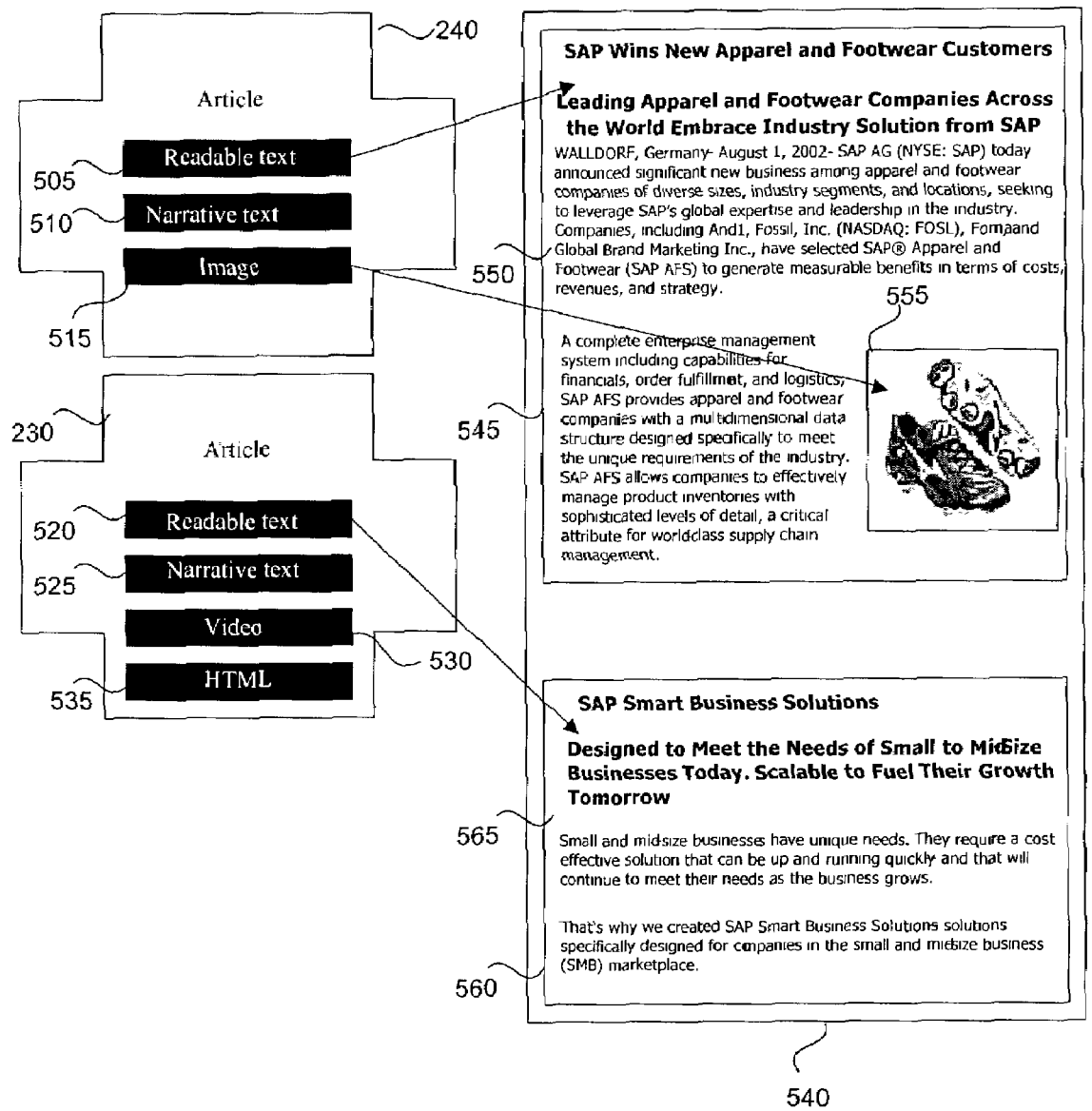
FIG. 5 demonstrates a first example of page generation.

Once the articles have been filtered, sorted, and prioritized, system 100 may begin the pagination process. FIG. 5 demonstrates a first example of page generation. In FIG. 5, articles 240 and 230, which were stored in bucket 410, are shown to contain content in various formats suitable for rendering in various media. For example, article 240 contains content blocks in the form of a readable text block 505, a narrative text block 510 (that is, text to be read as audio), and an image block 515. Similarly, article 230 contains content blocks in the form of a readable text block 520, a narrative text block 525, a video block 530, and an HTML block 535.

Based on knowledge of a user system onto which the page will be rendered, a page 540 is then created by pagination engine 165. In the example of FIG. 5, the user system capabilities and/or user preferences indicate that the article should be rendered as HTML and therefore only readable text and associated images are to be utilized.

Accordingly, page 540 includes article 240 rendered as a section 545, as well as article 230 rendered as a section 560. Section 545 includes readable text content block 505 rendered as a portion 550 in HTML form, as well as image information content block 515 rendered as an image 555 as part of the HTML. Article 230 includes only readable text content block 520 rendered as a portion 565, again in HTML form.

It should be understood from FIGS. 4 and 5 that article 240 was given a higher priority for display than article 230, and was therefore shown on page 540 prior to article 230. In general, relatively more important articles might be shown in a more prominent location on the page, while the less important ones, space permitting, might only be shown as headlines with reference (for example, hyperlinks) to the full article.

Figure 6:
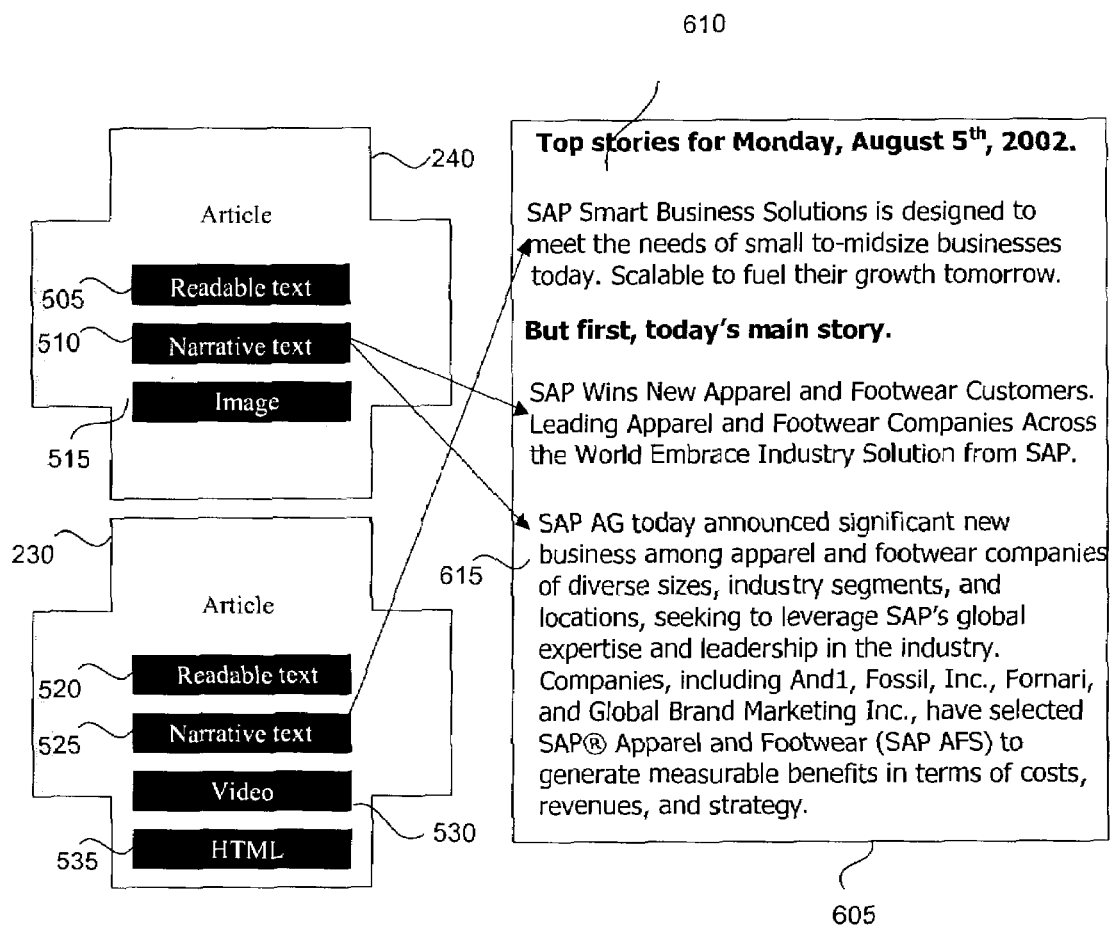
FIG. 6 demonstrates a second example of page generation.

FIG. 6 shows an alternate pagination process for rendering articles 240 and 230 within bucket 410. In FIG. 6, pagination engine 165 determines that user A should receive the content of articles 230 and 240 as audio. This might be the case for a user wishing to receive articles 240 and 230 via radio and/or cell phone. Accordingly, a page 605 includes a portion of narrative text content block 525 rendered as audio portion 610, as well as narrative text content block 510 rendered as an audio portion 615. In page 605, article 230 is still prioritized lower than article 240, and might therefore generally be rendered subsequent to article 240. However, in page 605, a slightly different format is shown, in which a portion of lower priority article is shown as a "top story" to be discussed later in the page 605, whereas the higher priority article 240 is provided in its entirety as the day's "main story." Alternatively, a "teaser" for the main story could be given first, and then returned to after the less-important articles were read. Such alternate formats mirror popular formats of conventional news programs, and may be preferred by some users.

It should be understood from FIGS. 5 and 6 that an article may contain several content blocks or content segments, which might each represent a subset of the total amount of content within the article (or might include all of the content). Together, these portions represent the entirety of the article content, however, the content need not be shown in its entirety. For example, image 515 is not included in page 605, because the articles were to be rendered only as audio. Thus, the provision of at least a portion of an article's content, in a format most suitable for a particular user, allows maximum flexibility in providing the user with information in a personalized, convenient format.

FIG. 7 shows an example of an article used in one implementation. In FIG. 7, the article is expressed in one possible extensible markup language ("XML") form, however, other implementations of an article may take other forms. In a section 705, the article contains some general attributes like the time it was created, the importance of the story, and the author who created it.

Article 700 also contains several content blocks for one or more possible rendering scenarios. For example, a section 710 includes a "text/narrative" content block for cases where an audio description of the content is necessary (for example, if the content is to be broadcast on radio or read by a TV spokesman). This content block is analogous to narrative text content blocks 510 and 525, and includes a headline section 715, as well as a detailed content section 720.

A "text/html" content block is shown in a section 725, which is useful for cases where the content will be shown in a web browser. Section 725 also contains a headline in a section 730, as well as a body of information (in this case, a table) in section a 735.

Finally, article 700 includes a list of discussion objects in a section 740. As discussed above, these discussion objects can be included when the article is first generated, and/or can be added with metadata enhancer 120 after generation is otherwise complete. Section 740 includes relevant discussion objects that were part of the article content. In this example, four business partners were discussed in the content; therefore, the discussion objects block contains four objects of class "BizPartner." The article also relates to, and mentions in the content, the Eastern region and thus an additional object block is included to represent that object.

The discussion objects also include information about what is shown for the purpose of enforcing a security policy. In this example, article 700 shows sales numbers of customers and therefore a security realm is defined for that article stating that fact. Thus, in a filtering process such as process 305 in FIG. 3, users who are not allowed to see articles of this security realm will be denied access to the article.

Defining classes and determining what classes are available may be done in many ways. For example, classes could be rigidly defined and coupled to the system 100, or classes could be defined in a distributed manner based on the incoming messages. In the latter case, system 100 assumes that an object and class exist if and when such object or class are read in an incoming article. It does not try to enforce validity based on a pre-defined object model; in this case, the full list of discussion classes is the object model referred to above with respect to metadata enhancer 120.

FIG. 8 demonstrates an example of an HTML result page 800 that includes article 700. Page 800 is generally organized like a newspaper front page, having a headline 805 (which in this case indicates the enterprise sponsoring the page). A main story 810, corresponding to article 700, is shown in the upper middle portion of the page. A section 815 shows current levels of the Dow Jones, NASDAQ, and S&P 500. The rest of page 800 includes additional hypothetical articles not previously described.

The filtering, sorting, prioritizing, and paginating processes already described determine whether an article is displayed in full size (for example, article 700 in section 810), simply as a link (for example, links within sections 820, 825, 830, 835, 840, and 850, which are shown grouped together with similar articles), with a "more" link (not shown) that does not include any details but allows access to additional articles, or not at all (in case there is no room on the screen). The rules under which the articles are rendered generally take into account both subjective (that is, according to user preferences) and objective (that is, according to the author) levels of importance assigned to each article and its content.

In FIG. 8, the highest-ranking article occupies a central location. If two or more articles are categorized as highest ranking, then a number of options are available for deciding how and whether to display them. Examples include: (i) one article could be selected, at random or otherwise, (ii) all, or some, of the articles could be rotated in and out of the page (which uses time slicing as well as real estate allocation), (iii) if there is enough space, then all of the articles could be displayed, or at least part of each of them, for example, by giving each article the same amount of space or allocating space based on priority, and (iv) one article could be selected for full, or primary display, and the others could be identified with links indicating the title of the article or with a "more" link.

The concept of using time as a variable (T), as well as space (which can be considered as a single variable of area or as two variables—X and Y), can be applied in many ways to render prioritized data on a page or other format. For example, articles or other data could be displayed at particular locations for specified times, scrolled, formed into a collage, zoomed in and out with a fixed or variable size space, etc.

It should be noted that articles within page 800 may take many various forms besides the form of a general news articles. For example, section 840 includes an email that can be read by, or read to, the user. Section 840 also includes internal documents to be approved by the user. As a final example, section 850 is devoted to a personal scheduling issue of the user.

In any case, page 800 is generally arranged such that more important articles, as determined by system 100, are assigned a more prominent position and/or size, whereas less important articles are assigned a less prominent position and/or size (and/or are shown only partially or in summary form). Such prioritized assignment of "real estate" on page 800 is generally without respect to a given category into which an article of page 800 might fall, but rather, as explained above, is determined based on the actual content of the article(s).

Some implementations may group together articles of similar type or content, and in essence "categorize" the page view. For example, all email articles might be shown together. Such categorization may be done dynamically, based on the available content. In some of these implementations, categories such as "emails" may be used due to the presence of a large number of articles within that category for a particular user; in these cases, a combined priority weighting may be used to determine their (collective) prominence on page 800. In others of these implementations, a location for a specific subset may be determined in advance; such fixed positioning may be used for all or part of page 800

Page 800 may allow the user to express his preferences regarding what is shown in several different ways. In this implementation of the user interface ("UI"), every identified discussion object in the page is highlighted and also an icon (for example, "smiley face" 860) is located next to some articles or groups of articles. By clicking on any of these icons and/or discussion objects, the user is provided with a dialog that allows him to express his opinion on the object or article associated with the point where he clicked.

For example, user A may have previously indicated that articles about the customer Wacky Foods (the company's most important customer) are to be upgraded. Article 700's importance is shown as Normal within section 705 of FIG. 7, but since it discusses Wacky Foods, its importance level is upgraded to Important for user A. Article 700 may thus be shown in a more prominent location in the result page for user A.

A future article about Wacky Foods may come in as already being designated as Important. In such a case, user A's upgrade will make that article Critical, emphasizing it in the result page 800. This later article will then show more prominently than article 700.

Figure 9:
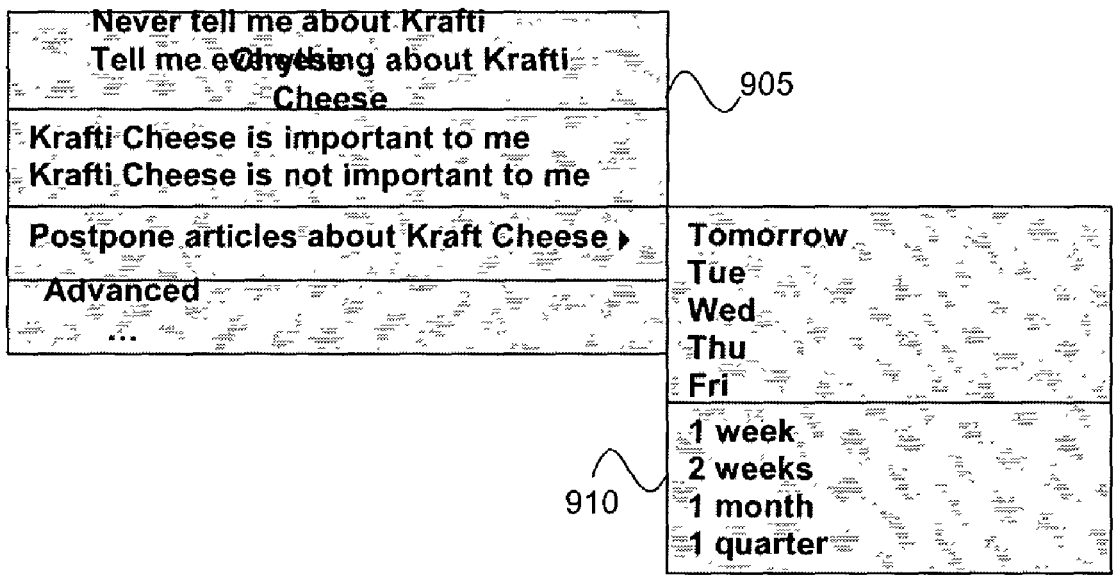
FIG. 9 is a first example of a context menu designed to allow users to input preference information.

Further illustrating techniques by which a user may indicate preferences as to which articles should be shown and how they should be shown, FIG. 9 demonstrates a context menu 905 designed to allow users to input preference information. Context menu 905 may be accessed by a user by clicking on a highlighted discussion object within an article.

For example, a user may click on the words "Krafti Cheese" within one of the links contained in section 820. In context menu 905, the user is then able to indicate one of five possible opinions on Krafti Cheese: never to be shown articles about Krafti Cheese (but note that in cases where articles contain both Krafti Cheese and a discussion object that the user has expressed explicit interest in, the article may still be shown); always to be shown articles dealing with Krafti Cheese; upgrade (or promote) the importance of articles containing Krafti Cheese; downgrade (or demote) the importance of articles containing Krafti Cheese (if the user downgrades a discussion object some predetermined number of times, that discussion object may be thereafter blocked completely); and postpone articles about Krafti Cheese for a specified period of time (this option is useful if the user has more important tasks at the moment but wants to be informed of such articles at a more convenient time). In the last example, context menu 910 illustrates time periods which may be selected to set a length of a postponement.

Finally, context menu 905 includes an advanced opinion dialog, provided for cases where the user wishes to express, for example, complex conditional opinions on the discussion object. One such condition might be to block all articles about Krafti Cheese unless they are marked as important. Another example might be to block Krafti Cheese articles that originated from publicly-available sources. The "Krafti Cheese" article within section 820 referred to above, about a CEO resignation, is an example of such an article. The fact that it is publicly accessible may be indicated as an attribute of the article, for example, as a security realm, as a custom attribute, or by an author of the article.

It is also possible, though not shown in FIG. 9, to allow the user to express an opinion about the class of the discussion object. This option would allow the user to no longer receive articles concerning any business partners, not just Krafti Cheese.

In a similar fashion, the user may express an opinion about an article as a whole. For example, if the user is no longer interested in receiving a stock market update in section 815, the user may click on the "smiley face" icon 860 next to the market article in section 815.

Figure 10:
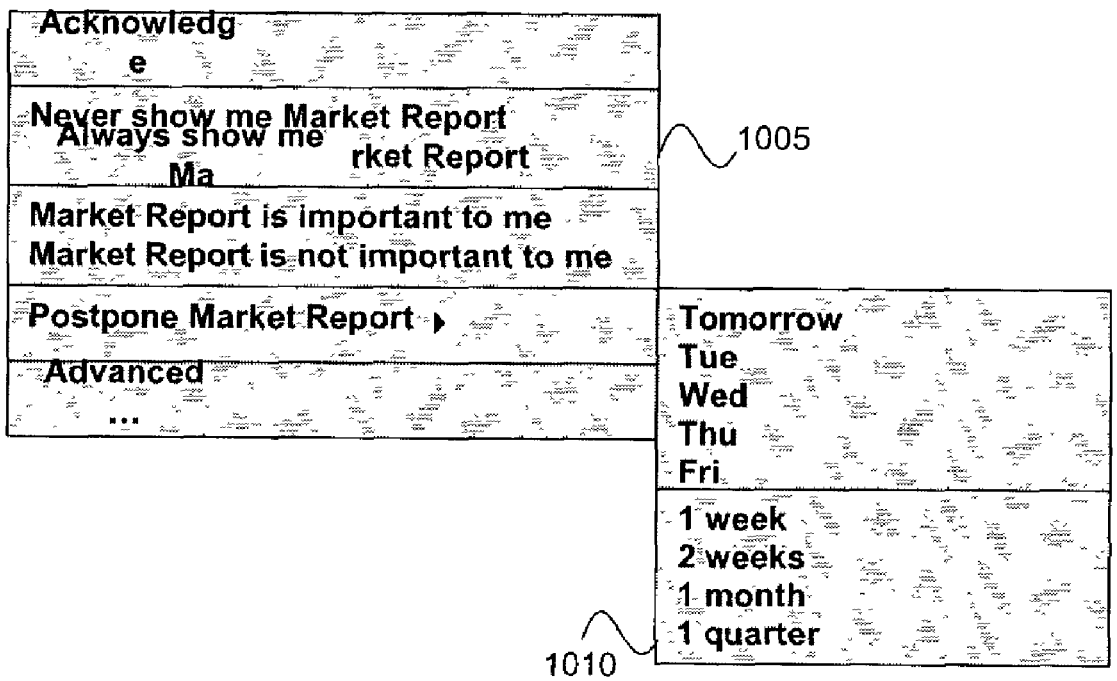
FIG. 10 is a second example of a context menu designed to allow users to input preference information.

FIG. 10 demonstrates an opinion dialog 1005 that enables the user to express his opinion about an article such as the market report article within section 815. Similarly to context menu 905, context menu 1005 allows the user to characterize the article in question. For the postpone operation, a box 1010 is available to provide similar options to those discussed with respect to context menu 910.

An additional option shown in context menu 1005 is the ability to Acknowledge an article, allowing the user to express the fact that he or she does not want to be informed of this particular instance of the article anymore. Future versions of the same article, however, would still be considered interesting to that user.

It is also possible to let the user provide more information. For example, the user may give a reason why he or she is no longer interested in this article, the reason being, for example, one of the discussion objects contained within the article. This feature may be useful in cases where the full article is not fully displayed on screen, and therefore its discussion objects are not visible. For example, the first article in section 840 talks about six documents, but names and authors are not shown as part of the link because of lack of space. The user may specify that he no longer wants to be notified about documents from John Doe (a hypothetical author of one of the documents), for example.

In many cases, the user would like to indicate his preferences regarding objects that are not currently displayed on the screen. Such objects may have been read in a story in a newspaper, or seen on TV, or heard in a rumor. For those cases, the system 100 provides a Tell Me input box or similar UI in section 855 that enables the user to enter the name of what he or she is looking for.

As an example, if the user heard from the sales manager that sales of Pizza Zitti are down 5% this quarter, the user can type in Pizza Zitti in the Tell Me box and press enter. The system 100 will look up the object that matches the text, possibly presenting several options for the user to choose from. In this case, Pizza Zitti is a product, so every article containing a reference to this product will be prioritized based on the user's preferences regarding Pizza Zitti.

FIG. 11 demonstrates a different technique by which the user may express his or her opinions about a discussion object. In FIG. 11, clicking on a highlighted discussion object results in a pop-up box that allows the user to rate the discussion object. In FIG. 11, the discussion object "Wacky Foods" has been given one out of a possible five stars in pop-up box 1105, whereas the discussion object "Have Your Cake, Inc." has been given four out of five stars in a pop-up box 1110. Pop-up boxes 1105 and 1110 also include an "x" and a "check" box, by which a user may choose to "block" the given object or select to "always see" it in the future, respectively, as described above. Pop-up boxes like boxes 1105 and 1110 may be used with respect to individual discussion objects, classes of discussion objects, or may be used with respect to articles as a whole.

Figure 12:
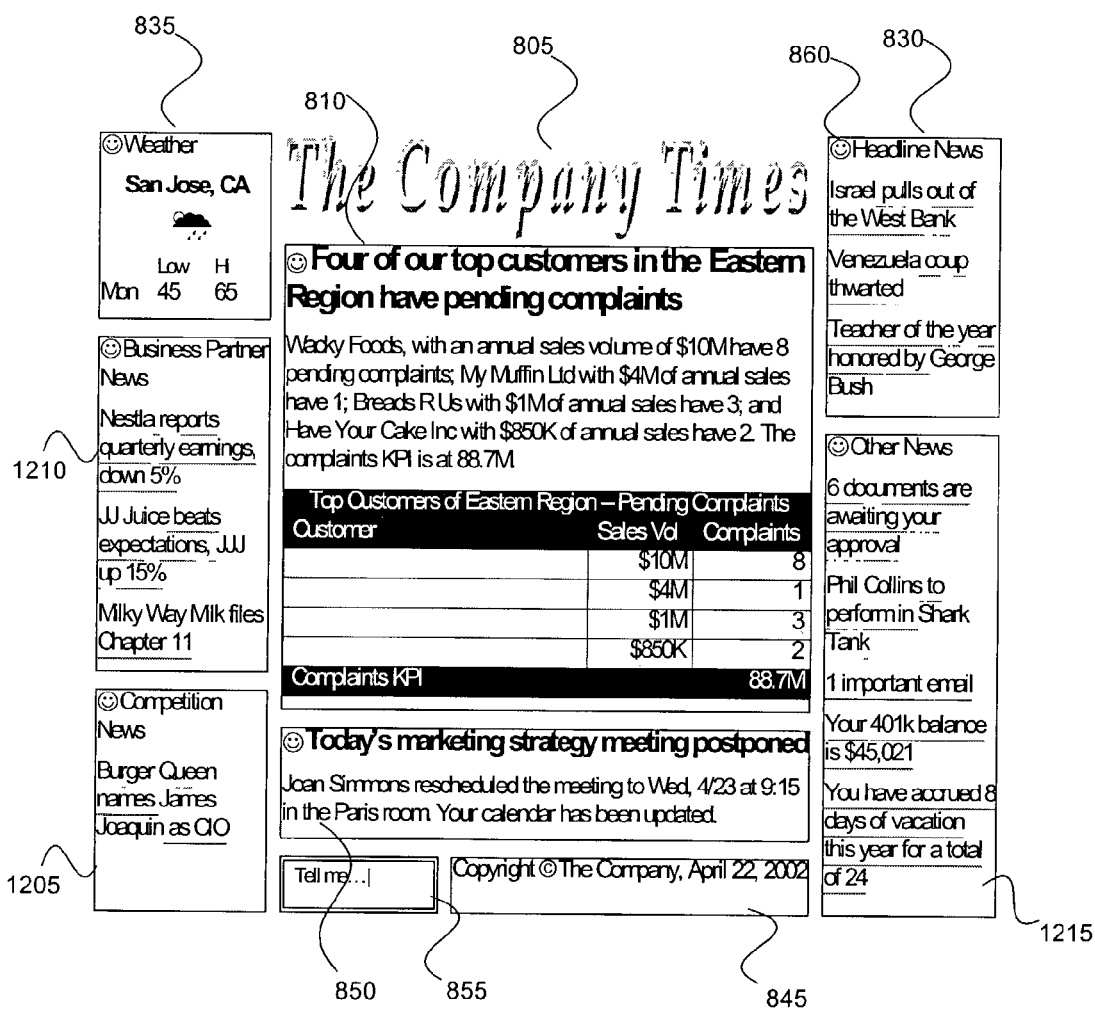
FIG. 12 is a page that reflects user-expressed opinions with respect to the page of FIG. 8.

FIG. 12 demonstrates a page 1200 that reflects user-expressed opinions with respect to page 800 of FIG. 8. Specifically, page 1200 illustrates the situation in which the user (1) clicked on the Market Report 815 opinion icon 860 and indicated "no interest" in Market Reports, and (2) clicked on the words "Krafti Cheese" in section 820 and indicated "no interest" in Krafti Cheese.

Page 1200 reflects the resulting new set of preferences. Specifically, articles about Krafti Cheese in sections 820 and 825 are removed, and a new article entitled "Milky Way Milk files Chapter 11" is included instead. Also, the Market Report in section 815 is gone, and the weather article in section 835 has taken its place. Finally, additional space created by the above changes, particularly movement of the weather article in section 835, permits the addition of two new articles in section 840.

In some implementations, system 100 may learn automatically by observing the user's behavior. For example, if a user clicks on a particular article, the implementation may increment the priority of one or more of the various discussion objects represented by that article. Two possibilities, for example, are that (1) all of the discussion objects or object classes in that article are incremented in priority, or that (2) only a primary discussion object in that article is incremented. A primary discussion object could be determined in a variety of ways, such as, for example, by counting occurrences of search strings in the article. Priority may be a numerical scale or otherwise, allowing easy incrementing and decrementing.

Various operations depicted in FIGS. 2-6 may be combined. For example, operations of agents in gathering information for articles may be combined with the filtering, sorting, prioritizing, and/or pagination operations. In one implementation, each user may have an individual "agent" that performs all of the filtering, sorting, prioritizing, and/or pagination operations when a page is requested by the user.

Also, articles may be pushed straight from a source, rather than being collected by an agent. In one implementation, articles are broadcast and are filtered at the time of broadcast, by the broadcaster, to place them in one or more buckets. In another implementation, a user's system performs the filtering operations on articles as the articles are broadcast. In either of these implementations, the function of the agent has been moved to the broadcaster and the user, respectively, and the agent execution environment has been removed.

One implementation may process articles as they come in, filtering them into the buckets of each user at that time. The articles wait in that bucket until such time as a user requests a page. At that time the prioritization and pagination processes kick in, and the page is created. This may provide improved performance over filtering at the time a user requests a page, particularly in cases where the user logs into the system 100 relatively rarely.

Various implementations allow: (i) filtering articles or other data based on content of the delivered or available data, (ii) adjusting display of data based on content, (iii) filtering articles dynamically, upon viewing, or otherwise, (iv) adjusting display of data dynamically, and/or (v) separating producers of articles or other data from consumers of the data.

Implementations discussed above contemplate the use of audio and video presentations as part of a personalized delivery of content. In some implementations, these and other features can be utilized outside of the context of system 100 and the associated discussions above, and can be implemented similarly to portal-based techniques.

Figure 13:
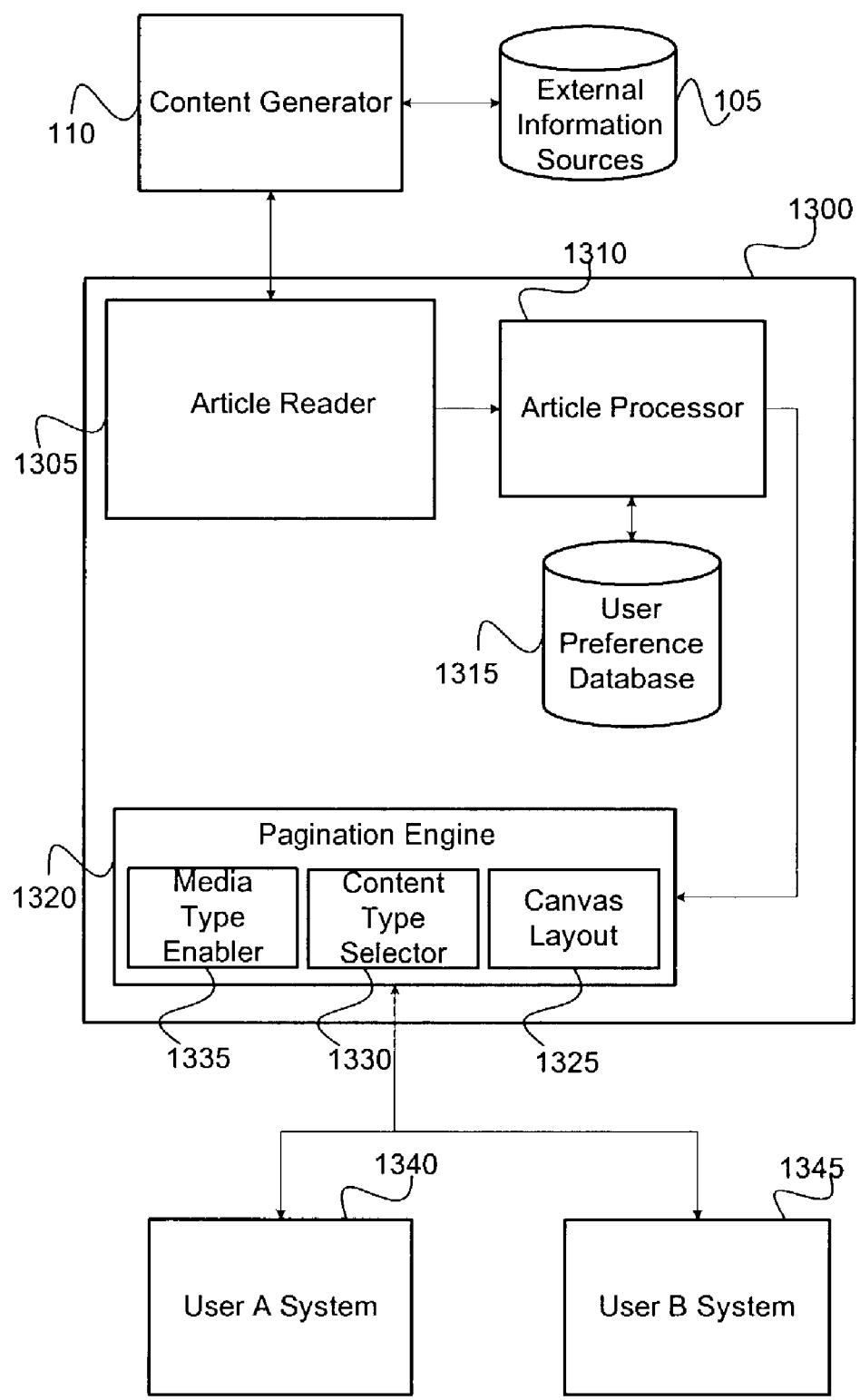
FIG. 13 is an architectural block diagram of an example of a content presentation system designed primarily for generating personalized audio and video.

FIG. 13 demonstrates an implementation of a content personalization system designed primarily for generating personalized audio and video-based information systems.

In FIG. 13, article reader 1305 obtains articles from content generator 110. An article reader 1305 need not include a metadata enhancer, and need not store the articles separately (although the articles could be cached for possible later use, as is known). An article processor may then associate articles with particular users, using a user preference database 1315. This association may occur by virtue of content metadata such as discussion objects contained within the articles, as discussed above, or may occur only by virtue of a comparison of general article attributes to user preferences.

A pagination engine 1320 communicates with both article processor 1310 and user systems 1340 and/or 1345. Pagination engine 1320, as with pagination engine 165 of FIG. 1, will typically have access to characteristics of the client system being used by each user, either from user preference database 1315, or determined from the user request at the time of the request.

In this way, pagination engine 1320 determines a layout of the canvas being used by each user, using a canvas layout subsystem 1325 that is similar to canvas layout subsystem 170 of FIG. 1. As with canvas layout subsystem 170, one of the services of the canvas layout subsystem 1325 is to determine how much "space" is available to the user for displaying articles, as well as any other user-specific capacity constraints relevant to deciding which articles to provide to the user(s).

Content-type selector 1330 may then determine which rendering media are available to the user for the selected canvas, and which articles are consistent, or can be made to be consistent, with that media. Media-type enabler 1335 is available to utilize a type of media that would not normally be available to the user, as discussed above with respect to media-type enabler 180.

As referred to above, in the implementation of FIG. 13, article selection and layout may be determined essentially as is done in the context of traditional portal technology, or may incorporate any or all of the advantageous features of system 100. In any case, as discussed in more detail below, system 1300 serves to provide personalized audio and/or video presentations above and beyond the context of traditional browser-based technologies.

FIG. 14 demonstrates an article 1400 used in one implementation of the system. Article 1400 is similar to article 700 in many respects, and is also written in XML. In article 1400, a section 1405 contains general attributes of the article, such as its author, time of creation, and level of importance. A section 1410 labels a first content portion as being narrative text in proper grammar for reading and having a headline portion 1415 and a details portion 1420. A section 1425 labels a second content portion as being HTML-based, with a headline in section 1430 and a table 1435, as its detailed content.

A section 1440 labels the next content block as containing a viewable image in a standard format such as ".gif." The image has an associated headline in section 1445, and is itself located in section 1450. Finally, a section 1455 labels a last content block as containing music, which may be, for example, background music having no words, in a standard format such as "midi." The actual midi file is in a section 1460.

Although not explicitly shown, it should be understood that video (for example, MPEG) and other formats may also be used. Also, as should be understood from FIG. 6, articles such as article 1400 may include summaries of the articles, or of article portions. Also, content blocks may be labeled as mutually exclusive or not, for example, typically an article summary would not be included in the same page as the article itself, as that would be redundant.

Figure 15:
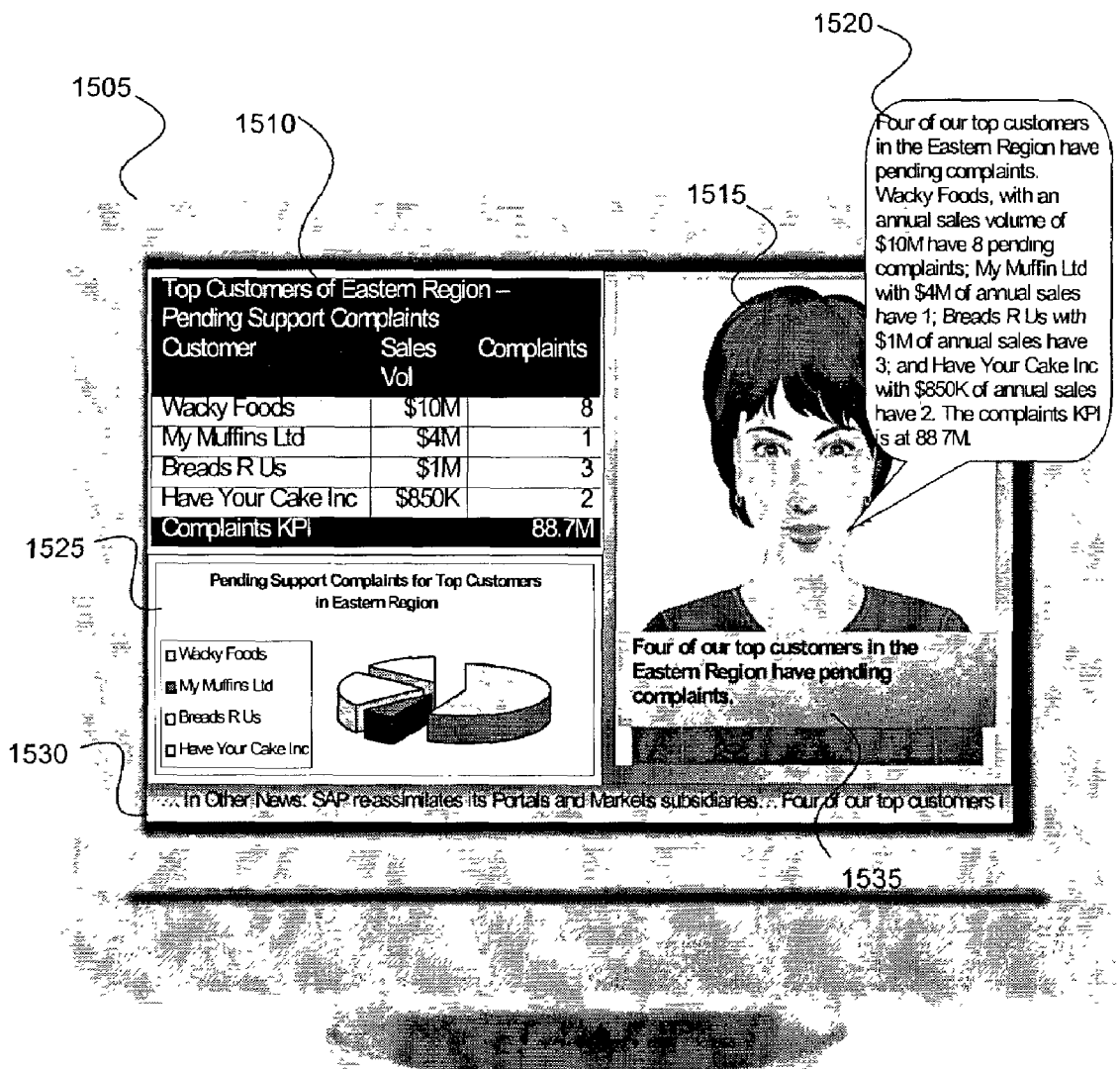
FIG. 15 is an example of a rendering of an article using the system of FIG. 13.

FIG. 15 shows one implementation of a rendering of article 1400. In FIG. 15, a computer 1505 displays in a section 1510 the HTML table from sections 1430/1435 of article 1400. A section 1515 depicts an anchorwoman "reading" the story of section 1415/1420; that is, a computer-generated image of a woman with animated lips and eyes moving to simulate talking, generates audio represented by a section 1520. Headline 1425 may be read by the generated anchorwoman image, and/or may be shown as an image 1535 (note that, since narrative text can be treated as readable text, it does not always have to be read).

A section 1525 displays the gif image from sections 1445/1450 of article 1400, and though not explicitly shown in FIG. 15, the midi music file from section 1460 may be played in the background, or may be ignored. Finally, a section 1530 displays additional headlines from other articles, which may be aggregated for inclusion in the display of computer 1505 by pagination engine 1325. These articles may be, for example, articles designated as "headlines of the day" by article processor 1415 or articles related to the currently-displayed article. These articles may be non-specific to users A and B, or may be specific to a group of users.

In FIG. 15, the layout places the sensory input types into appropriate positions. For example, the anchorwoman cannot "read" an image; she can only read narrative text. The system 1300 has chosen, using canvas layout subsystem 1325, to display the two viewable images contained in the article 1400; two are shown because there is enough real estate on the screen of computer 1505. Other implementations may show one at a time, flicking between them, or not show some of them at all.

The following examples demonstrate various utilizations of content presentation systems. Many people today spend a lot of their time commuting to work. They sit in a car usually listening to the radio without the ability to access corporate data, or perhaps they have a conference call with several colleagues. Content presentation systems as described herein may allow this time to be better used by generating an audio track summarizing the day's news. The track's time length can be set so as to cover the time it takes the employee to commute. Then, the employee can simply call a phone number to access the information needed to start the day. Alternatively, the audio track may be delivered to a capable audio player like an MPEG Layer 3 ("MP3") player or a PDA. Delivery may be made, for example, by downloading from a cellular network.

In a company building, there are several places of high-traffic where people congregate. Those places are often characterized by not having access to computers. Two examples of these places are the lobby and the cafeteria. Implementations of content presentation systems may be used to generate a video track that will run in a loop and be shown on a television screen. People can then watch that video while they wait in the lobby (for example, public company data shown to a guest of the company) or eat lunch (for example, internal company news for its employees).

Another example of a location where people wait, often with little or nothing to do, is an airport. In many airports, next to the boarding gate, there are TV sets tuned to a news station, such as the Cable News Network ("CNN"). In some cases, the channel is even customized for airport use. However, there is only one channel for all airports, so the channel is not personalized to a particular airport or even a gate. Various implementations allow for such personalization. For example, depending on a destination of a flight leaving a near-by gate, as well as connecting flights out of that location, the video may show relevant weather reports, flight delays, security alerts, or terminal maps.

Various implementations allow a content editor to personalize an information system for a group of users, such as by personalizing a TV station for passengers at a particular gate in a specific airport. Various implementations allow an individual user to personalize an information system for himself, such as by personalizing a voicemail recording of particular news items so that the user can listen to it during the morning commute. The acquisition, rendering, and delivery of such personalized information can be automated and no human involvement is necessary. Mediums such as, for example, TV, telephone, computer, and radio can be used.

Moreover, the personalization process itself can be automated. For example, using the example of the airport gate TV, the destination of a flight can be input as "user preferences" in database 1315 (here the "user" is, for example, an airport administrator, and system 1340 is the gate TV) by accessing a flight schedule database.

As already mentioned, acquiring, rendering, and editing data, as well as various other operations, can be performed in whole or in part using elements of system 100. Additional editing may be used to control the content for a specified period of time. For example, a user may personalize the rendering format to provide ten minutes of different content in an audio format. Articles or other data could be prioritized based on content, with entire articles narrated in order of priority. Such narration could be used in an audio format, and also in a video format with additional information being visible.

A number of implementations of methods and systems for presenting personalized content have been described. Nevertheless, it will be understood that various modifications may be made. For example, the system 100 can be used without the personalized security and/or preference-based filtering performed in content-based router 130; that is, all articles in database 125 may be prioritized by PAP 145. Also, prioritization in PAP 145 may occur before security/preference-based filtering. Security-based filtering may occur without preference-based filtering, and vice-versa. As a final example, content-based router 130 could be implemented in two separate subsystems, one subsystem being responsible for security-based filtering, while the other subsystem is responsible for preference-based filtering. Accordingly, other implementations are within the scope of the following claims.

What is claimed is:

1. A computer-implemented method comprising:

generating received information into discrete media assets at a content generator, each media asset including actual content included as one or more content types within the media assets, the one or more content types including a text, video, audio and/or hypertext markup language ("HTML") code content type;

generating content metadata for each media asset at an article reader based upon the actual content of the media assets and an enterprise object model, the enterprise object model describing how the content metadata should be interpreted;

comparing the content metadata to an access control database at a content-based router based upon receiving links to the media assets or content metadata for each media asset, the access control database storing security clearance information for each user;

filtering the media assets at the content-based router based upon comparing the content metadata to the access control database;

comparing the filtered media assets to a user preference database storing media asset preference information for users, at a personalized article processor;

individually prioritizing, at the personalized article processor, the filtered media assets for the users into prioritized media assets that each include a priority level, the priority levels based upon comparing the actual content of the filtered media assets to the user preference database;

assigning a prominence to each of the prioritized media assets based on the priority level, such that the filtered media assets prioritized as high priority based on comparing the actual content of the filtered media assets to the user preference database are assigned a higher prominence, and that filtered media assets prioritized as low priority based upon comparing the actual content of the filtered media assets to the user preference database are assigned a lower prominence;

determining, at a pagination engine, a capacity of a display device for the users, the capacity being stored in the user preference database;

formatting the prioritized media assets for the users based upon the capacity of the display device, at the pagination engine;

outputting the formatted media assets from the pagination engine to the display device based on the prominence assigned to the formatted media asset, the highest priority media asset being output in a central location of the display device;

receiving a user feedback selection regarding the formatted media assets;

re-prioritizing the filtered media assets based upon the user feedback selection; and outputting the re-prioritized formatted media assets to the display device.

2. A computer-implemented method comprising:

generating received information into discrete media assets at a content generator, each media asset including actual content included as one or more content types within the media asset;

generating content metadata for each media asset at an article reader based upon the actual content of the media assets and an enterprise object model;

comparing the content metadata to a filtering database at a content-based router based upon receiving information referencing the media assets;

filtering the media assets at the content-based router based upon comparing the content metadata to the filtering database;

comparing the filtered media assets to a user preference database storing media asset preference information for users, at a personalized article processor;

individually prioritizing, at the personalized article processor, the filtered media assets for the users into prioritized media assets that each include a priority level, the priority levels based upon comparing the actual content of the filtered media assets to the user preference database;

assigning a prominence to each of the prioritized media assets based on the priority level, such that the filtered media assets prioritized as high priority based on comparing the actual content of the filtered media assets to the user preference database are assigned a higher prominence, and that filtered media assets prioritized as low priority based upon comparing the actual content of the filtered media assets to the user preference database are assigned a lower prominence;

determining a capacity of a rendering medium for the users at a pagination engine;

formatting the prioritized media assets for the users based upon the capacity of the rendering medium, at the pagination engine;

outputting the formatted media assets from the pagination engine to the rendering medium based on the prominence assigned to the formatted media assets;

receiving a user feedback selection regarding the formatted media assets;

re-prioritizing the filtered media assets based upon the user feedback selection; and outputting the re-prioritized formatted media assets.

3. The method of claim 2, farther comprising:

gathering the information using an agent; and transmitting the information from the agent to the content generator.

4. The method of claim 2, wherein the received information is generated into discrete media assets that each further include content metadata associated with the actual content.

5. The method of claim 2, wherein the content metadata includes the author of the actual content, the general subject heading of the actual content, content metadata, attribute information, or portions of the actual content.

6. The method of claim 2, wherein the one or more content types include a text, video, audio and/or hypertext markup language ("HTML") code content type.

7. The method of claim 2, wherein a portion of the actual content is included in the media asset in multiple content types.

8. The method of claim 2, wherein the actual content further comprises a web page, an electronic mail message, contact information, weather information, or a stock quote.

9. The method of claim 2, wherein the enterprise object model describes how the content metadata should be interpreted.

10. The method of claim 2, wherein the enterprise object model is a customer enterprise object model, a supplier object model, or a standardized object model.

11. The method of claim 2, wherein the information referencing the media assets includes links to the media assets or the content metadata for each media asset.

12. The method of claim 2, wherein the filtering database is an access control database storing security clearance information for each user.

13. The method of claim 2, wherein the filtering database is the user preference database.

14. The method of claim 2, further comprising populating the user preference database based upon receiving user preferences via a preference form.

15. The method of claim 2, further comprising populating the user preference database over time based upon receiving user feedback.

16. The method of claim 2, wherein the rendering medium is an audio or video device.

17. The method of claim 2, further comprising accessing the capacity of the rendering medium stored in the user preference database.

18. The method of claim 2, further comprising receiving the information at the content generator.

19. The method of claim 2, further comprising accessing the media assets at the article reader, from the content generator.

20. The method of claim 2, further comprising storing the media assets in an article database.

21. The method of claim 2, further comprising receiving information referencing the media assets at a content-based router.

22. The method of claim 2, further comprising receiving the filtered media assets at the personalized article processor from the content-based router.

23. The method of claim 2, wherein outputting the formatted media assets further comprises outputting a media asset with the highest priority in a central location of the rendering medium.

24. The method of claim 2, wherein outputting the formatted media asset further comprises:
outputting a portion of a media asset with less than the highest priority,
outputting a media asset with the highest priority after outputting the portion of the media asset with less than the highest priority, and
outputting a reminder of the media asset with less than the highest priority after outputting the media asset with the highest priority.

25. The method of claim 2, wherein the formatted media assets are output using extensible markup language ("XML").

26. The method of claim 2, wherein the actual content includes discussion objects discussed as part of the content.

27. The method of claim 26, wherein the discussion objects are categorized by discussion class.

28. The method of claim 2, further comprising filtering the prioritized media assets based upon the capacity of the rendering medium.

29. A device comprising:
a content generator configured to generate received information into discrete media assets, each media asset including actual content included as one or more content types within the media asset;
an article reader configured to generate content metadata for each media asset based upon the actual content of the media assets and an enterprise object model;
a content-based router configured to:
compare the content metadata to a filtering database based upon receiving information referencing the media assets, and
filter the media assets based upon comparing the content metadata to the filtering database;
a personalized article processor configured to:
compare the filtered media assets to a user preference database storing media asset preference information for users,
individually prioritize the filtered media assets for the users into prioritized media assets that each include a priority level, the priority levels based upon comparing the actual content of the filtered media assets to the user preference;
assign a prominence to each of the prioritized media assets based on the priority level, such that the filtered media assets prioritized as high priority based on comparing the actual content of the filtered media assets to the user preference database are assigned a higher prominence, and that filtered media assets prioritized as low priority based upon comparing the actual content of the filtered media assets to the user preference database are assigned a lower; and
re-prioritize the filtered media assets based upon a received user feedback selection regarding the formatted media assets; and
a pagination engine configured to:
determine a capacity of a rendering medium for the users,
format the prioritized media assets for the users based upon the capacity of the rendering medium, at the pagination engine, and
output the formatted media assets and the re-prioritized formatted media assets from the pagination engine to the rendering medium based on the prominence assigned to the formatted media assets.

30. A computer program product tangibly embodied in a machine-readable storage medium, wherein the computer program product comprises instructions that, when read by a machine, operate to cause data processing apparatus to:
generate received information into discrete media assets at a content generator, each media asset including actual content included as one or more content types within the media asset;
generate content metadata for each media asset at an article reader based upon the actual content of the media assets and an enterprise object model;
compare the content metadata to a filtering database at a content-based router based upon receiving information referencing the media assets;

filter the media assets at the content-based router based upon comparing the content metadata to the filtering database;

compare the filtered media assets to a user preference database storing media asset preference information for users, at a personalized article processor;

individually prioritize, at the personalized article processor, the filtered media assets for the users into prioritized media assets that each include a priority level, the priority levels based upon comparing the actual content of the filtered media assets to the user preference database;

assign a prominence to each of the prioritized media assets based on the priority level, such that the filtered media assets prioritized as high priority based on comparing the actual content of the filtered media assets to the user preference database are assigned a higher prominence, and that filtered media assets prioritized as low priority based upon comparing the actual content of the filtered media assets to the user preference database are assigned a lower prominence;

determine a capacity of a rendering medium for the users at a pagination engine;

format the prioritized media assets for the users based upon the capacity of the rendering medium, at the pagination engine;

output the formatted media assets from the pagination engine to the rendering medium based on the prominence assigned to the formatted media assets;

receive a user feedback selection regarding the formatted media assets;

re-prioritize the filtered media assets based upon the user feedback selection; and output the re-prioritized formatted media assets.

* * * * *